United States Patent
Zhao et al.

(10) Patent No.: US 11,909,987 B2
(45) Date of Patent: *Feb. 20, 2024

(54) VIDEO CODING METHOD AND DEVICE FOR AVOIDING SMALL CHROMA BLOCK INTRA PREDICTION

(71) Applicant: Tencent America LLC, Palo Alto, CA (US)

(72) Inventors: Liang Zhao, Sunnyvale, CA (US); Xiang Li, Saratoga, CA (US); Xin Zhao, San Diego, CA (US); Shan Liu, San Jose, CA (US); Guichun Li, Milpitas, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,340

(22) Filed: Mar. 12, 2023

(65) Prior Publication Data

US 2023/0217032 A1 Jul. 6, 2023

Related U.S. Application Data

(63) Continuation of application No. 17/941,937, filed on Sep. 9, 2022, now Pat. No. 11,729,399, which is a
(Continued)

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/119* (2014.11); *H04N 19/176* (2014.11);
(Continued)

(58) Field of Classification Search
CPC .. H04N 19/159; H04N 19/119; H04N 19/176; H04N 19/186; H04N 19/61; H04N 19/96
(Continued)

(56) References Cited

FOREIGN PATENT DOCUMENTS

WO  2013155398 A2  10/2013

OTHER PUBLICATIONS

Zhi-Yi Lin et al.,. "CE3-2.1.1 and CE3-2.1.2: Removing 2×2, 2×4, and 4×2 chroma CBs," Joint Video Experts Team (JVET) of ITU-T SG 16 WP 3 and ISO/IEC JTC 1/SC 29/WG 11, Jul. 2019, JVET-O0050-v2. 5 pages.
(Continued)

*Primary Examiner* — Nguyen T Truong
(74) *Attorney, Agent, or Firm* — Anova Law Group, PLLC

(57) ABSTRACT

A method for controlling block intra prediction is provided for a decoder. The method includes: obtaining a coded video bitstream; decoding, prediction information of a current coding unit (CU) in a segment of a current picture from the coded video bitstream; determining, according to the prediction information, a prediction type of a chroma coding block (CB) of the current CU, the prediction type being intra prediction or inter prediction; and reconstructing the chroma CB according to the prediction information, where a width of any reconstructed chroma CB intra-predicted from the coded video bitstream is greater than 2.

17 Claims, 8 Drawing Sheets

Related U.S. Application Data continuation of application No. 17/022,055, filed on Sep. 15, 2020, now Pat. No. 11,509,910.

(60) Provisional application No. 62/928,147, filed on Oct. 30, 2019, provisional application No. 62/924,524, filed on Oct. 22, 2019, provisional application No. 62/901,121, filed on Sep. 16, 2019.

(51) Int. Cl.
*H04N 19/61* (2014.01)
*H04N 19/96* (2014.01)
*H04N 19/119* (2014.01)
*H04N 19/186* (2014.01)

(52) U.S. Cl.
CPC ........... *H04N 19/186* (2014.11); *H04N 19/61* (2014.11); *H04N 19/96* (2014.11)

(58) Field of Classification Search
USPC .................................................... 375/240.12
See application file for complete search history.

(56) References Cited

OTHER PUBLICATIONS

Benjamin Bross et al., "Versatile Video Coding (Draft 6)", Joint Video Experts Team (JVET) of ITU-T SG 16 WP B and ISO/IEC JTC 1/SC 29/WG 11, Jul. 2019, JVET-O2001-vE. 455 pages.

Jianle Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, Jul. 2019, JVET-O2002-v2. 87 pages.

Benjamin Bross et al., "Versatile Video Coding (Draft 7)," Joint Video Experts Team (JVET) of ITU-T SG 16 WP B and ISO/IEC JTC 1/SC 29/WG 11, Oct. 2019, JVET-P2001-v9. 490 pages.

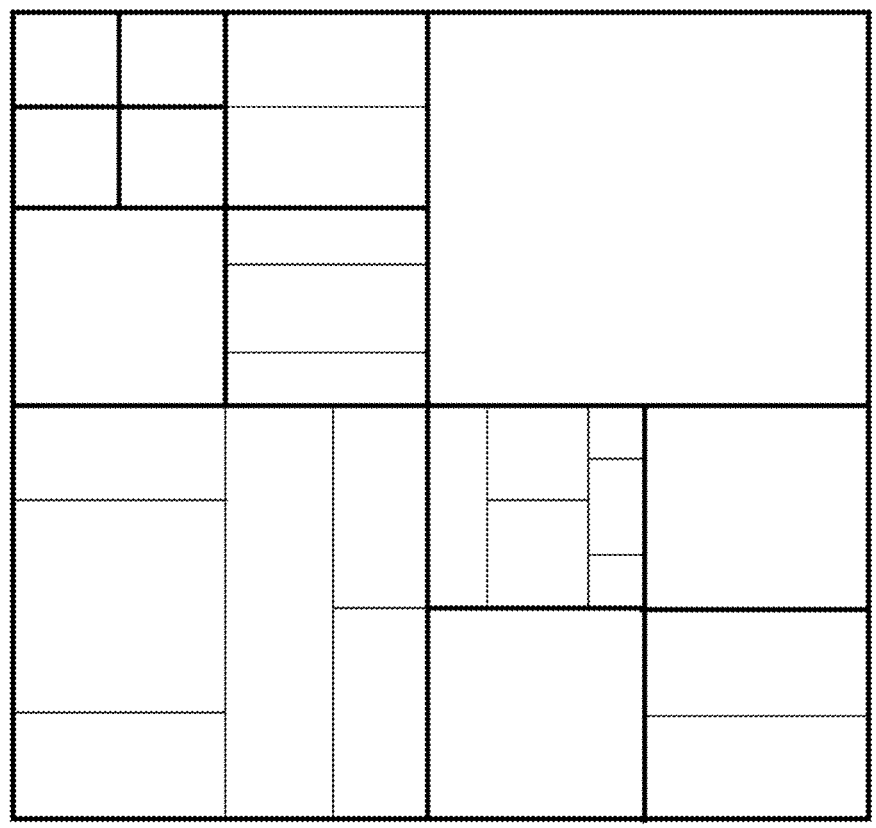
FIG. 9
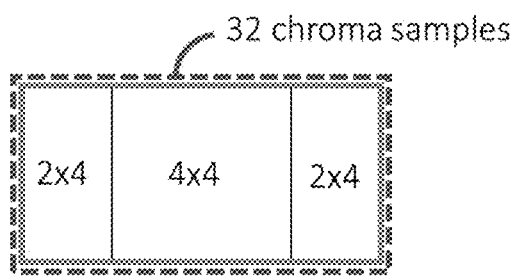
FIG. 10A
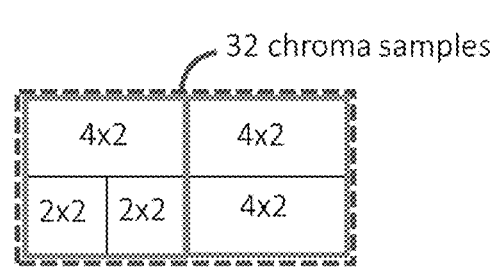
FIB. 10B

VIDEO CODING METHOD AND DEVICE FOR AVOIDING SMALL CHROMA BLOCK INTRA PREDICTION

CROSS REFERENCE TO RELATED APPLICATIONS

This application is a continuation of U.S. application Ser. No. 17/941,937 filed on Sep. 9, 2022; U.S. application Ser. No. 17/941,937 is a continuation of U.S. application Ser. No. 17/022,055 filed on Sep. 15, 2020, and issued on Nov. 22, 2022 as U.S. Pat. No. 11,509,910; and U.S. application Ser. No. 17/022,055 claims priority to U.S. provisional patent application No. 62/901,121, filed on Sep. 16, 2019, U.S. provisional patent application No. 62/924,524, filed on Oct. 22, 2019, and U.S. provisional patent application No. 62/928,147, filed on Oct. 30, 2019, contents of all of which are incorporated by reference in their entirety.

FIELD OF THE TECHNOLOGY

This application relates to the field of video technologies and, specifically, to a method and device for avoiding small chroma block intra prediction.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to develop the next video coding standard beyond HEVC. JVET formally launched the standardization process of next-generation video coding beyond HEVC, i.e., the Versatile Video Coding (VVC), and established VVC Test Model (VTM) algorithm description and encoding method.

In typical hardware video encoders and decoders, processing throughput drops when a picture has many small intra blocks because of sample processing data dependency between neighboring intra blocks. The predictor generation of an intra block requires top and left boundary reconstructed samples from neighboring blocks. Therefore, intra prediction has to be sequentially processed block by block, thereby affecting processing throughput.

The disclosed methods and systems are directed to solve one or more problems set forth above and other problems.

SUMMARY

One aspect of the present disclosure provides a method for controlling block intra prediction for a decoder. The method includes: obtaining a coded video bitstream; decoding, prediction information of a current coding unit (CU) in a segment of a current picture from the coded video bitstream; determining, according to the prediction information, a prediction type of a chroma coding block (CB) of the current CU, the prediction type being intra prediction or inter prediction; and reconstructing the chroma CB according to the prediction information, where a width of any reconstructed chroma CB intra-predicted from the coded video bitstream is greater than 2.

Another aspect of the present disclosure provides a video decoder including a memory and a processor coupled to the memory. The processor is configured to perform: obtaining a coded video bitstream; decoding, prediction information of a current coding unit (CU) in a segment of a current picture from the coded video bitstream; determining, according to the prediction information, a prediction type of a chroma coding block (CB) of the current CU, the prediction type being intra prediction or inter prediction; and reconstructing the chroma CB according to the prediction information, where a width of any reconstructed chroma CB intra-predicted from the coded video bitstream is greater than 2.

Another aspect of the present disclosure provides a method for controlling block intra prediction for an encoder. The method includes: obtaining a video bitstream; encoding the video bitstream with prediction information of a current coding unit (CU) in a segment of a current picture, and outputting the encoded video bitstream, where a width of any reconstructed chroma CB intra-predicted from the encoded video bitstream is greater than 2. Encoding the video bitstream may include: upon determining that the segment has a single tree structure indicating a same partitioning structure for both luma and chroma components of the segment, and that a prediction type of a chroma coding block (CB) of the current CU is intra prediction, including the prediction type of the chroma CB of the current CU in the prediction information, wherein when block area size of the chroma CB is smaller than or equal to a threshold T1, T1 being a positive integer, a luma component of the current CU is allowed to be sub-partitioned into multiple prediction units (PUs) for intra prediction, and a chroma component of the current CU only has one PU, a PU being a basic unit for prediction. Encoding the video bitstream may also include: upon determining that the current CU belongs to a current Small Chroma Intra Prediction Unit (SCIPU) and a tree depth of the SCIPU is less than or equal to a threshold T2, and that the prediction type of the chroma CB is intra prediction, including the prediction type of the chroma CB in the prediction information, a SCIPU being a coding tree node whose chroma CB size is larger than or equal to TH chroma samples and has at least one child luma CB whose size is smaller than 4TH luma samples, and T2 being 1 or 2. Encoding the video bitstream may also include: upon determining that the segment has a dual tree structure indicating separate partitioning structures for luma and chroma components of the segment, and that the prediction type of the segment is intra prediction, including the prediction type of the segment and a variable MinCbLog 2SizeC in the prediction information, the variable MinCbLog 2SizeC indicating a binary logarithmic value of a minimum size of the chroma CB of the current CU.

Another aspect of the present disclosure provides a video encoder including a memory and a processor coupled to the memory. The processor is configured to perform the method for controlling block intra prediction for the encoder as described above.

Other aspects of the present disclosure can be understood by those skilled in the art in light of the description, the claims, and the drawings of the present disclosure.

BRIEF DESCRIPTION OF THE DRAWINGS

FIG. 9 illustrates an example of quadtree with nested multi-type tree coding block structure consistent with an embodiment of the present disclosure;

FIGS. 10A and 10B illustrate two Small Chroma Intra Prediction Unit (SCIPU) examples consistent with an embodiment of the present disclosure;

DETAILED DESCRIPTION

Figure 1:
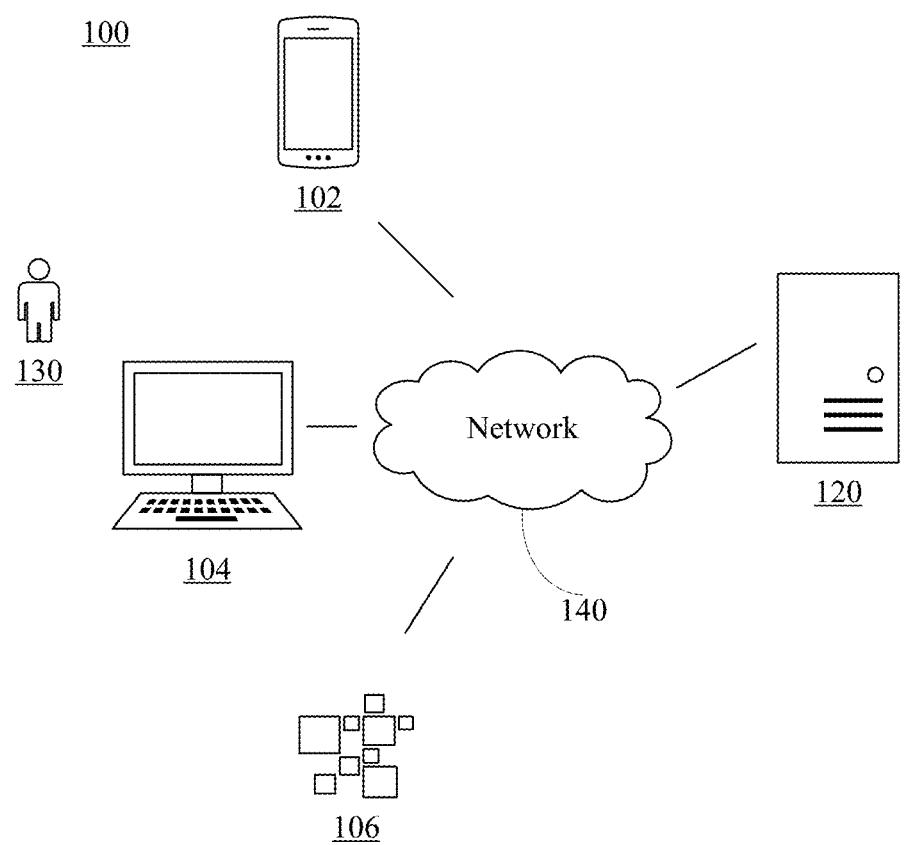
FIG. 1 illustrates an operating environment incorporating certain embodiments of the present disclosure.

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Certain acronyms and terms used in this disclosure are listed as follows. Other acronyms and/or terms not listed may be found from a VVC standard or other related documents.

HEVC: High Efficiency Video Coding
VVC: Versatile Video Coding
JVET: Joint Video Exploration Team
SPS: sequence parameter set
PPS: picture parameter set
NAL: network abstraction layer
MPM: most probable mode
WAIP: Wide-Angle Intra Prediction
QT: Quad-Tree
BT: Binary Tree
TT: Ternary Tree
CU: Coding Unit
PU: Prediction Unit
TU: Transform Unit
PDPC: Position Dependent Prediction Combination
ISP: Intra Sub-Partitions
MTS: Multiple Transform Selection
LFNST: Low Frequency Non-Separable Transform
MRLP (or MRL): Multiple Reference Line Prediction
MIP: Matrix based Intra Prediction
BDPCM (or RDPCM): Residual differential pulse coded modulation
CCLM: Cross-Component Linear Mode/Model
BDOF: Bi-directional optical flow
VPDU: Visual Process Data Unit
CBF: Coded Block Flag
CIIP: Combined Inter/Intra prediction
RST: Reduced Secondary Transform
WIIP: Weighted Inter/Intra prediction.
LIC: Luma Illumination Compensation.
TPM: Triangular partitioning mode
SCIPU: Smallest chroma intra prediction unit.
Bitstream: A sequence of bits, in the form of a NAL unit stream or a byte stream, that forms the representation of coded pictures and associated data forming one or more CVS. VVC: A published version (e.g., JVET-P2001) of the Specification of VVC standard, which is incorporated herein by reference.
Chroma: An adjective, represented by the symbols Cb and Cr, specifying that a sample array or single sample is representing one of the two color difference signals related to the primary colors.
Coding tree block (CTB): An N×N block of samples for some value of N such that the division of a component into CTBs is a partitioning.
Coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.
Motion vector (MV): A two-dimensional vector used for inter prediction that provides an offset from the coordinates in the decoded picture to the coordinates in a reference picture.
Flag: A variable or single-bit syntax element that can take one of the two possible values: 0 and 1.
Syntax element: An element of data represented in the bitstream.
Syntax structure: Zero or more syntax elements present together in the bitstream in a specified order.

The disclosed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

FIG. 1 shows an operating environment 100 incorporating certain embodiments of the present disclosure. As shown in FIG. 1, the operating environment 100 may include a variety of devices with video functionalities. For example, the operating environment 100 may include a mobile device 102, a terminal device 104, and an electronic device 106. Other types of devices may also be included.

The operating environment 100 may also include a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred as a terminal device, which may include any user terminal, such as a personal digital assistant (PDA), a mobile phone, a smart phone, an integrated messaging device (IMD), a tablet computer, a notebook computer, a desktop computer, and other computing devices. The terminal device may also include any image or video capturing devices, such as a digital camera, a video camera, a security camera, a vehicle on-board camera, and a stereo camera, etc., or any electronic device with a video function, such as a digital doorbell, an autonomous driving sensor, a digital voice assistant, a smart speaker, a smart appliance, or any industrial or commercial IoT systems with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

The network 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

The server 120 may include any type of server computer system or multiple computer systems configured in a server cluster or distributed in different locations. The server 120 may also include a cloud server on a cloud computing platform. The server 120 may also be referred as a server entity, which may be integrated with any appropriate device (including the electronic device) for performing the disclosed server-side functionalities of video decoding and application processing.

Figure 2:
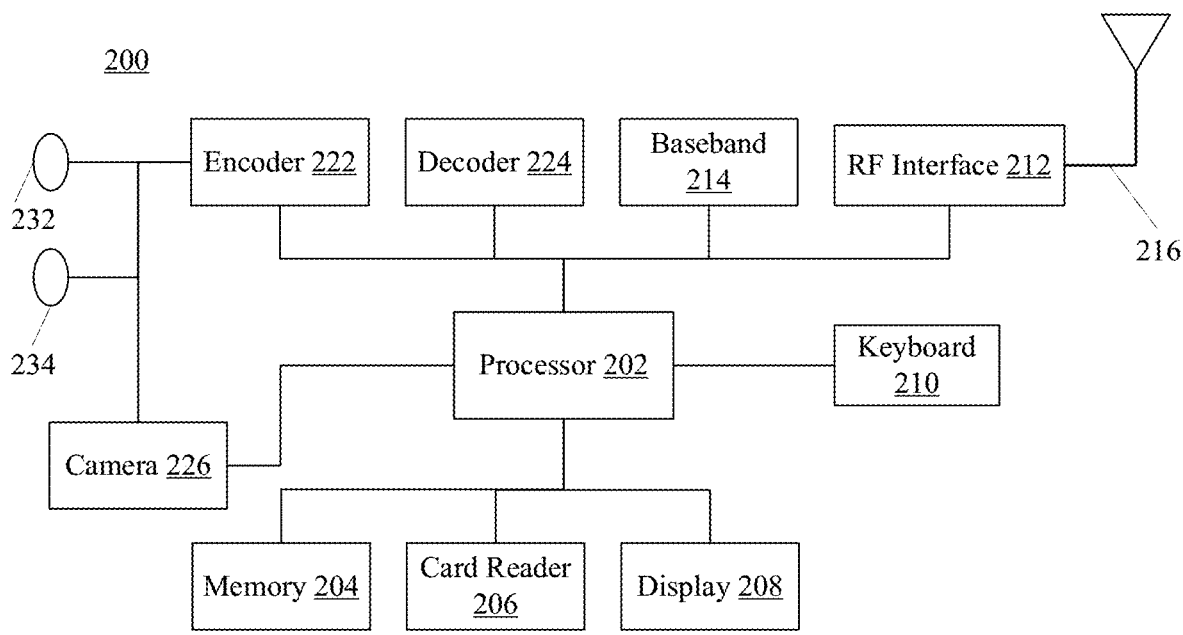
FIG. 2 illustrates a computer system consistent with embodiments of the present disclosure.

FIG. 2 illustrates an exemplary computer system implementing certain aspects of the variety of terminal devices 102, 104, and/or 106, and/or server 120. As shown in FIG. 2, the computer system 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the computer system 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile or non-transitory memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the computer system 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202. The encoder 222 and/or the decoder 224 may be implemented as a hardware circuitry in the electronic device 200, or may be implemented as a software program by the electronic device 200, or a combination of the hardware circuitry and the software program. The computer system 200 may implement embodiments of the disclosed method of avoiding small chroma block intra prediction by using the encoder 222 and/or the decoder 224.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video.

Returning to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

During operation, a user of a terminal device may use a video application to view local video content, or transmit and/or receive video content to and/or from server 120. Alternatively, users of the various terminal devices may use various video applications to communicate video content with each other. In one embodiment, one user may communicate video content with another user via the server 120, or the server 120 may set up the communication channel between the users, so that one user may direct communicate video with the other user via the communication channel.

Figure 3:
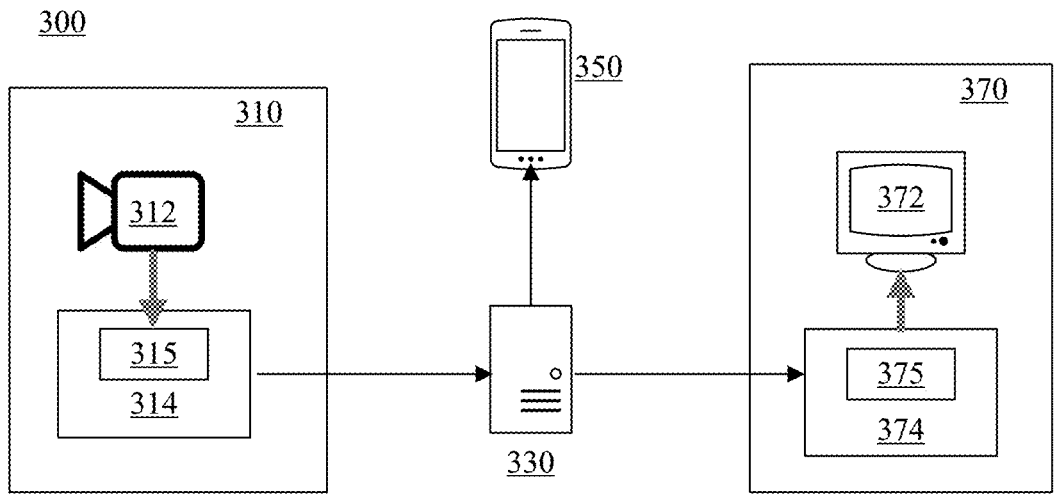
FIG. 3 illustrates a multiple-user video conference interface consistent with embodiments of the present disclosure.

FIG. 3 illustrates an example for a video streaming application of the present disclosure. The method and device provided by the present disclosure may be equally applicable to other video enabled applications, including, for example, video playback applications, video conferencing, digital TV, storing of compressed video on digital media including CD, DVD, memory stick and the like, and so on.

As shown in FIG. 3, a streaming system 300 may include a video source unit 310, a streaming server 330, a first client streaming device 350, and a second client streaming device 370. The video source unit 310 may include a video capture device 312, for example a digital camera or a digital camcorder, configured to acquire video data stream in an uncompressed format. The video capture device 312 may also be a memory device that stores a video data stream in an uncompressed format. The video data stream in the uncompressed format may have a high data volume compared to encoded video stream data. The video source unit 310 may further include a video processing unit 314 that implements a video encoder 315. The video encoder 315 may include hardware, software, or a combination thereof to enable or implement aspects of the present disclosure as described in more detail below. The video encoder 315 may have similar structure and functions as encoder 222 shown in FIG. 2. The video encoder 315 is configured to process the video stream data in the uncompressed format to generate encoded video stream data. The encoded video stream data has a lower data volume compared to the uncompressed video stream data, and may be transmitted to and stored on a streaming server 330 for live broadcast or on-demand broadcast. Client streaming devices, such as the first client streaming device 350 and second client streaming device 370, can access the streaming server 330 to retrieve copies of the encoded video steam data. The client streaming device 370 may include a video decoder 375, for example, implemented by a video processing unit 374. The video decoder 375 decodes the incoming copy of the encoded video stream data and creates an outgoing stream of decoded video data that can be rendered on a display 372 (e.g., a display screen) or other rendering devices. The video decoder 375 may have similar structure and functions as decoder 224 shown in FIG. 2. The streaming system 300 may implement embodiments of the disclosed method of avoiding small chroma block intra prediction by using the encoder 315 and/or the decoder 375. In the streaming system 300, the uncompressed video data can be encoded and the video stream data can be decoded according to certain video coding/compression standards. Examples of those standards include ITU-T Recommendation H.265. In an example, the video data is encoded under a video coding standard informally known as Versatile Video Coding (VVC).

Figure 4:
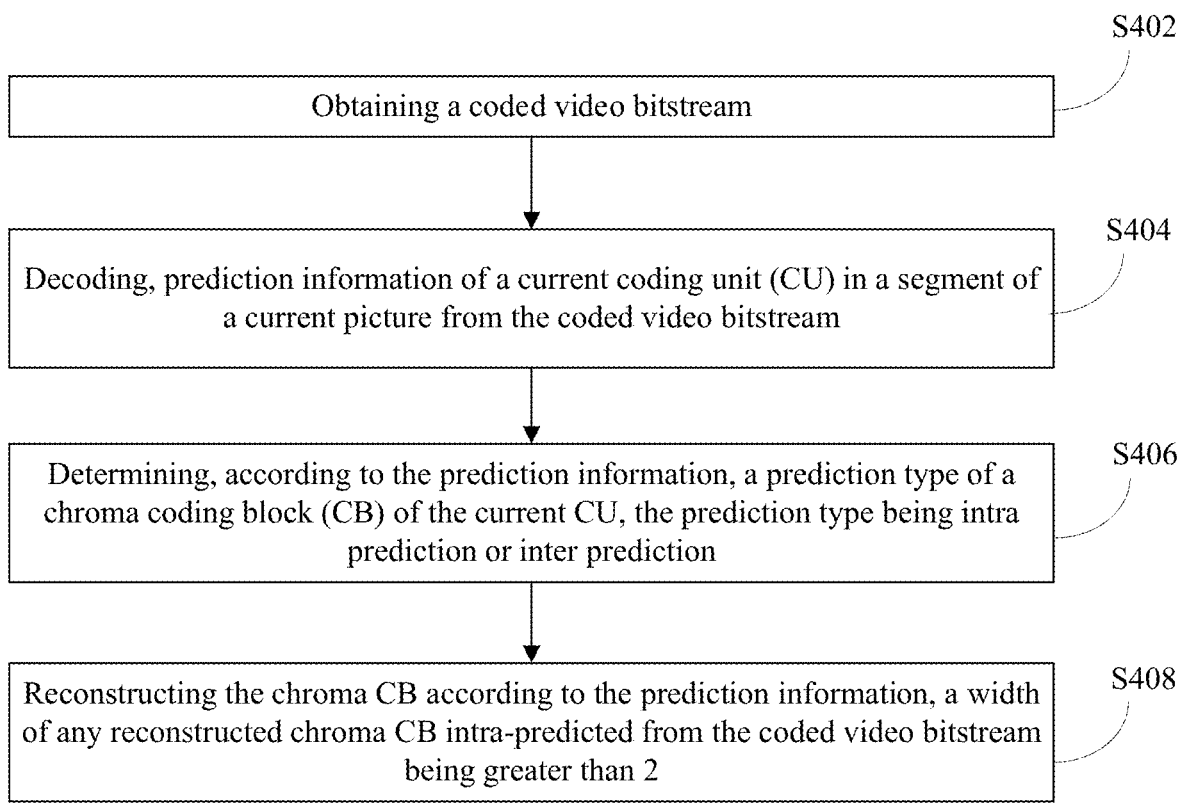
FIG. 4 illustrates an exemplary encoding and decoding process consistent with embodiments of the present disclosure.

More generally, FIG. 4 illustrates a video coding process performed by a decoder consistent with the disclosed embodiments. The video coding process can avoid small chroma block intra prediction. A small chroma block, as used herein, may refer to a chroma block whose width is 2 chroma samples, or a chroma block whose height is 2 chroma samples.

As shown in FIG. 4, at the beginning of the process, a coded video bitstream is obtained (S402). The coded bit stream may be obtained by a video application (e.g., video playback application, video streaming application, video conferencing application) from a local storage or a remote server. The coded video bitstream may be encoded based on embodiments disclosed in the present disclosure.

The video source that is represented by the bitstream is a sequence of pictures in decoding order. The color space of frames/slices/pictures of the video may include luminance (luma) component indicating brightness of the pixels and chrominance (chroma) component indicating color difference components. The color format may be referred as YUV format or YCbCr format, where Y indicates luma component, U and V or Cr and Cb indicate color components. The coded video stream may apply different YUV formats.

Figure 5:
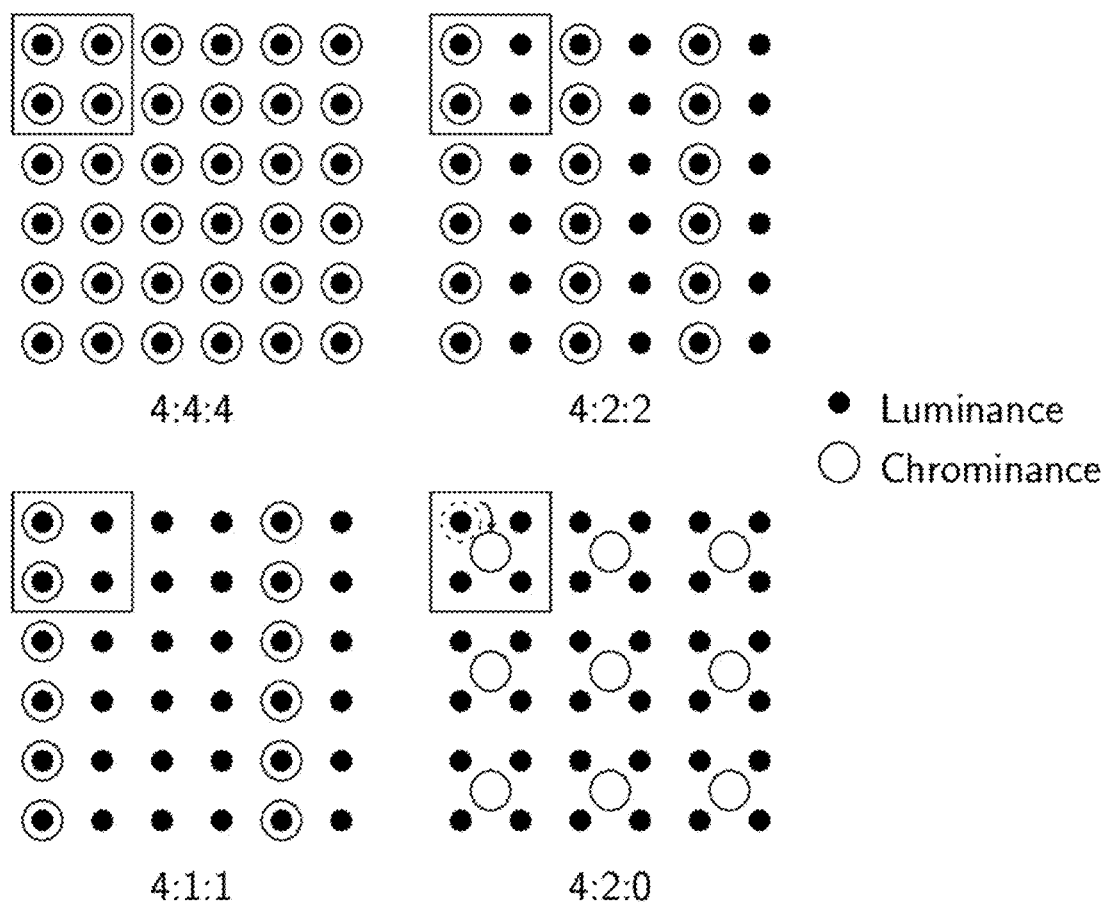
FIG. 5 illustrates four exemplary color formats consistent with an embodiment of the present disclosure.

FIG. 5 illustrates four exemplary YUV color formats. As shown in FIG. 5, for YUV 4:4:4 format, both width and height of U and V picture are the same as that of Y picture. For YUV 4:2:2 format, the height of U and V picture is the same as that of Y picture but the width of U and V picture is half of that of Y picture. For YUV 4:1:1 format, the height of U and V picture is the same as that of Y picture but the width of U and V picture is quarter of that of Y picture. For YUV 4:2:0 format, both width and height of U and V picture are half of that of Y picture.

In VVC, the source and decoded pictures are each comprised of one or more sample arrays: Luma (Y) only (monochrome); Luma and two chroma (YCbCr or YCgCo); Green, blue, and red (GBR, also known as RGB); Arrays representing other unspecified monochrome or tri-stimulus color samplings (for example, YZX, also known as XYZ).

In VVC, variables SubWidthC and SubHeightC are specified in Table 1, depending on the chroma format sampling structure, which is specified through chroma_format_idc and separate_colour_plane_flag.

TABLE 1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array. In 4:2:0 sampling, each of the two chroma arrays has half the height and half the width of the luma array. In 4:2:2 sampling, each of the two chroma arrays has the same height and half the width of the luma array. In 4:4:4 sampling, depending on the value of separate_colour_plane_flag, the following applies: If separate_colour_plane_flag is equal to 0, each of the two chroma arrays has the same height and width as the luma array. Otherwise (separate_colour_plane_flag is equal to 1), the three colour planes are separately processed as monochrome sampled pictures. The number of bits necessary for the representation of each of the samples in the luma and chroma arrays in a video sequence is in the range of 8 to 16, inclusive, and the number of bits used in the luma array may differ from the number of bits used in the chroma arrays. Exemplary embodiments disclosed in the present disclosure are generally realted to samples with both luma and chroma components.

Returning to FIG. 4, prediction information of a current CU in a segment of a current picture can be decoded from the coded video stream (S404). In the coded video stream, each picture of the original video is partitioned into a plurality of segments (e.g., square samples of the same size), such as macroblocks, coding tree units (CTUs), and the like. In the following embodiments, CTU is used as an example of the partitioned segment of the video picture. A CTU may be further partitioned into coding units (CUs) based on its block partitioning structure, also referred as partitioning tree structure, or a coding tree. The coding tree may include one or more tree structures such as binary tree, quad tree, ternary tree, etc.

The decoder may parse the coded video stream and extract sequence information and parameters for groups of pixels/samples (the groups including pictures, tiles, slices, macroblocks, CTUs, CUs, blocks, transform units, prediction units, etc.), to reconstruct such groups in the video. A CU may have corresponding parameters and prediction information such that a region corresponding to the CU in the original picture of the video can be reconstructed based on the signaling information in a decoding process. The prediction information may include, for example, a prediction type (e.g., inter prediction, intra prediction, combined inter and intra prediction) of luma coding block (CB) of the current CU, a prediction type of chroma CBs of the current CU, inter prediction information (e.g., description of redundant information according to encoding technique, motion vectors, merge mode information, information about reference pictures), and/or intra prediction information (e.g., intra prediction direction information according to intra coding modes and techniques, information about reference blocks in the same picture). A coding block decoded based on intra prediction may be referred as intra CB; and a coding block decoded based on inter prediction may be referred as inter CB.

Further, groups of samples partitioned from the picture, such as CTUs and CUs all include luma component and chroma component. A CTU is allowed to have separate tree structures for its luma component and chroma component. In some embodiments, the CTU has a single tree structure indicating a same partitioning structure for both luma and chroma components of the CTU. In this case, a CU from the CTU includes three coding blocks: a luma coding block and two chroma coding blocks. In some embodiments, the CTU has a local dual tree structure indicating same first N levels of partitioning structures for luma and chroma components of the CTU, N being an integer greater than 1 and less than total levels of the partitioning structure of the luma component. A CU corresponding to a leaf node at any of the first N levels contain one luma CB and two chroma CB; a CU at levels deeper than level N includes just one luma CB or just two chroma CBs. That is, after level N, the luma component and the chroma component are split differently, or the luma component is further split and the chroma component is not split. The single tree structure and the dual tree structure may be used for CTUs in P slices or B slices. In some embodiments, the CTU has a dual tree structure indicating separate partitioning structures for luma and chroma components of the CTU. The dual tree structure may be used for CTUs in I slices, and a CU from the CTU includes either a luma CB or just two chroma CBs. Examples of block partitioning schemes (coding tree schemes) are described below.

In HEVC, a CTU is split into CUs by using a quadtree structure denoted as coding tree to adapt to various local characteristics. The decision on whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU.

In VVC, pictures are divided into a sequence of coding tree units (CTUs). The CTU concept is same to that of the HEVC. For a picture that has three sample arrays, a CTU consists of an N×N block of luma samples together with two corresponding blocks of chroma samples. The maximum allowed size of the luma block in a CTU is specified to be 128×128 (although the maximum size of the luma transform blocks is 64×64).

In some embodiments, a quad-tree (QT) plus binary tree (BT) block partitioning structure (hereinafter referred as QTBT structure) is used in CTUs. The QTBT structure removes the concepts of multiple partition types, i.e. it removes the separation of the CU, PU and TU concepts, and supports more flexibility for CU partition shapes. In the QTBT block structure, a CU can have either a square or rectangular shape.

Figure 6:
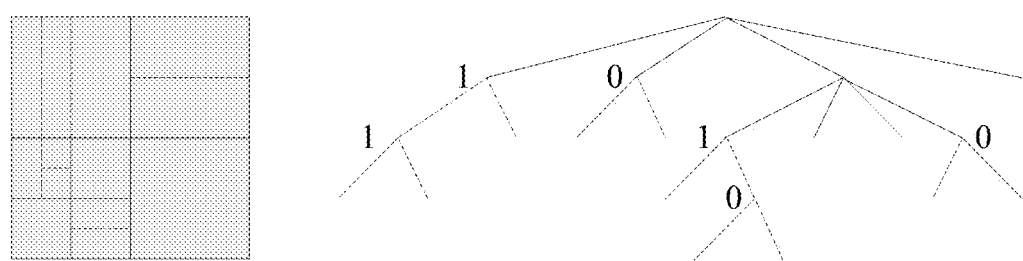
FIG. 6 illustrates a quad-tree (QT) plus binary tree (BT) block partitioning structure consistent with an embodiment of the present disclosure.

FIG. 6 illustrates an exemplary QTBT structure. As shown in FIG. 6, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. Left side of FIG. 6 illustrates an example of block partitioning by using QTBT, and right side of FIG. 6 illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In HEVC, the binary tree leaf nodes shown in FIG. 6 are called coding units (CUs), and that segmentation is used for prediction and transform processing without any further partitioning. This means that the CU, PU and TU have the same block size in the QTBT coding block structure.

In the JEM, a CU sometimes consists of coding blocks (CBs) of different color components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

In some embodiments, the following parameters are defined for the QTBT partitioning scheme: —CTU size: the root node size of a quadtree, the same concept as in HEVC; MinQTSize: the minimum allowed quadtree leaf node size; MaxBTSize: the maximum allowed binary tree root node size; MaxBTDepth: the maximum allowed binary tree depth; and MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it is not further split by the binary tree since the size exceeds the MaxBTSize (i.e., 64×64). Otherwise, the leaf quadtree node could be further partitioned by the binary tree. Therefore, the quadtree leaf node is also the root node for the binary tree, and the binary tree depth (BTDepth) at this node as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

In addition, the QTBT scheme supports the flexibility for the luma and chroma to have a separate QTBT structure. In some embodiments, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

In some embodiments, CTUs may include a Multi-type-tree (MTT) structure. MTT is a more flexible tree structure than QTBT. In MTT, other than quad-tree and binary-tree, horizontal center-side and vertical center-side triple-trees are introduced. The triple-tree may also be referred as ternary tree.

The key benefits of the triple-tree partitioning includes: complement to quad-tree and binary-tree partitioning, triple-tree partitioning is able to capture objects which locate in block center while quad-tree and binary-tree are always splitting along block center; the width and height of the partitions of the triple trees are always power of 2 so that no additional transforms are needed. The design of two-level tree is mainly motivated by complexity reduction. Theoretically, the complexity of traversing of a tree is $T^D$, where T denotes the number of split types, and D is the depth of tree.

Figure 7:
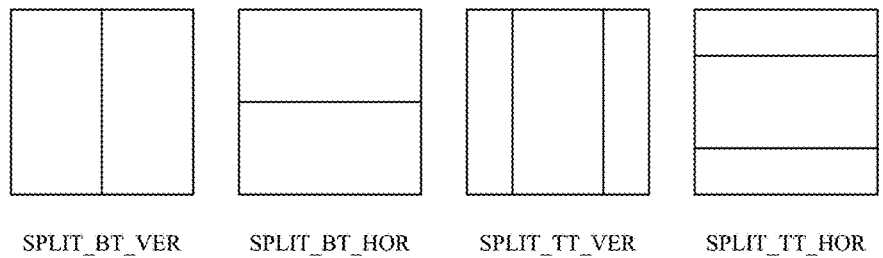
FIG. 7 illustrates multi-type tree splitting modes consistent with an embodiment of the present disclosure.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 7, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 8:
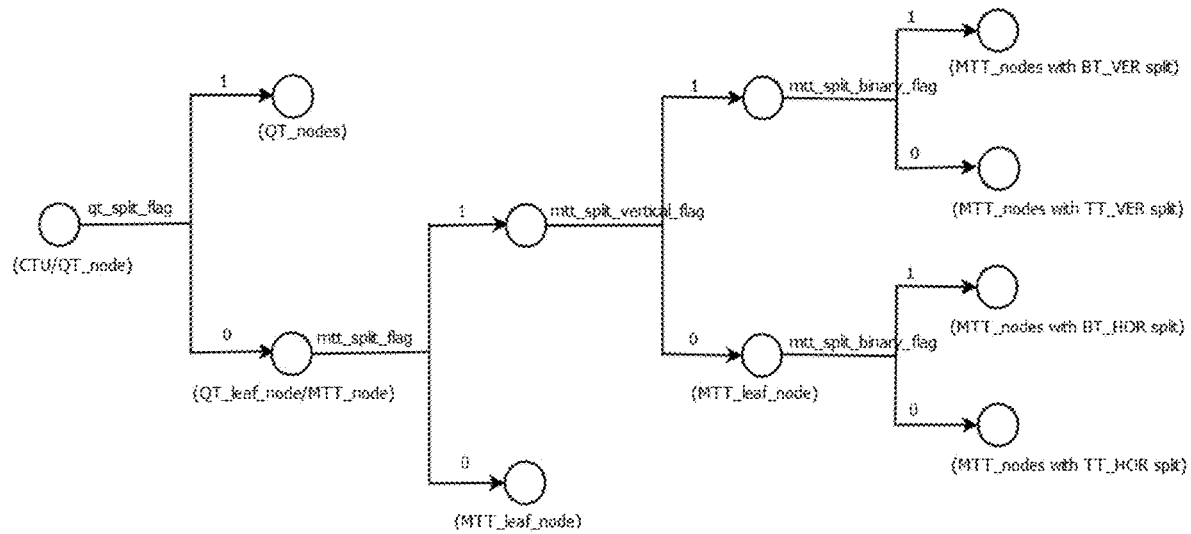
FIG. 8 illustrates the signalling mechanism of the partition splitting information in quadtree with nested multi-type tree coding tree structure consistent with an embodiment of the present disclosure.

FIG. 8 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived.

FIG. 9 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by Sequence Parameter Set (SPS) syntax elements for the quadtree with nested multi-type tree coding tree scheme.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

To allow 64×64 Luma block and 32×32 Chroma pipelining design in VVC hardware decoders, TT split is forbidden when either width or height of a luma coding block is larger than 64. TT split is also forbidden when either width or height of a chroma coding block is larger than 32.

In VTM6, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB is partitioned into CUs by one coding tree structure, and the chroma CTB s are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

Returning to FIG. 4, according to the prediction information of the current CU, a prediction type of a chroma coding block of the current CU is determined (S406). The prediction type may be, for example, intra prediction, or inter prediction. The chroma CB can be reconstructed according to the prediction type and the prediction information (S408). Here, a width of any reconstructed chroma CB intra-predicted from the coded video bitstream is greater than 2.

In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

In VVC, there are total 87 intra prediction modes, where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

Position Dependent Prediction Combination (PDPC) is applied to the following intra modes without signaling: planar, DC, WAIP modes, horizontal, vertical, bottom-left angular mode (mode 2) and its 8 adjacent angular modes (mode 3 ~10), and top-right angular mode (mode 66) and its 8 adjacent angular modes (mode 58 ~65).

For the chroma component of an intra coded block, the encoder selects the best chroma prediction modes among five modes including Planar (mode index 0), DC (mode index 1), Horizontal (mode index 18), Vertical (mode index 50), Diagonal (mode index 66) and a direct copy of the intra prediction mode for the associated luma component, namely DM mode. The mapping between intra prediction direction and intra prediction mode number for chroma is shown in Table 2.

TABLE 2

Mapping between intra prediction direction and intra prediction mode for chroma

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X (0 <= X <= 66 ) |
| 0 | 66 | 0 | 0 | 0 | 0 |
| 1 | 50 | 66 | 50 | 50 | 50 |

TABLE 2-continued

Mapping between intra prediction direction and intra prediction mode for chroma

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X ( 0 <= X <= 66 ) |
| 2 | 18 | 18 | 66 | 18 | 18 |
| 3 | 1 | 1 | 1 | 66 | 1 |
| 4 | 0 | 50 | 18 | 1 | X |

To avoid duplicate mode, the four modes other than DM are assigned according the intra prediction mode of the associated luma component. When the intra prediction mode number for the chroma component is 4, the intra prediction direction for the luma component is used for the intra prediction sample generation for the chroma component. When the intra prediction mode number for the chroma component is not 4 and it is identical to the intra prediction mode number for the luma component, the intra prediction direction of 66 is used for the intra prediction sample generation for the chroma component.

In typical hardware video encoders and decoders, processing throughput drops when a picture has many small intra blocks because of sample processing data dependency between neighboring intra blocks. The predictor generation of an intra block requires top and left boundary reconstructed samples from neighboring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed.

In VVC, the dual tree in intra picture allows to apply different partitioning in the chroma coding tree compared to the luma coding tree, the dual tree introduces longer coding pipeline and the QTBT MinQTSizeC value range and MinBtSizeY and MinTTSizeY in chroma tree allow small chroma blocks such as 2×2, 4×2, and 2×4. It provides difficulties in practical decoder design. In single coding tree, since chroma partitions always follows luma and the smallest intra CU is 4×4 luma samples, the smallest chroma intra CB is 2×2. Therefore, in VTM5.0, the smallest chroma intra CBs in single coding tree is 2×2. The worst case hardware processing throughput for VVC decoding is only ¼ of that for HEVC decoding. Moreover, the reconstruction process of a chroma intra CB becomes much more complex than that in HEVC after adopting tools including cross-component linear model (CCLM), 4-tap interpolation filters, position-dependent intra prediction combination (PDPC), and combined inter intra prediction (CIIP). It is challenging to achieve high processing throughput in hardware decoders.

Small Chroma Intra Prediction Unit (SCIPU) aims to disallow chroma intra CBs smaller than 16 chroma samples by constraining the partitioning of chroma intra CBs, which was adopted into VVC draft 6. In single coding tree, a SCIPU is defined as a coding tree node whose chroma block size is larger than or equal to TH chroma samples and has at least one child luma block smaller than 4TH luma samples, where TH is set to 16 in this contribution. It is required that in each SCIPU, all CBs are inter, or all CBs are non-inter, i.e., either intra or IBC. In case of a non-inter SCIPU, it is further required that chroma of the non-inter SCIPU shall not be further split and luma of the SCIPU can be further split. In this way, the smallest chroma intra CB size is 16 chroma samples, and 2×2, 2×4, and 4×2 chroma CBs are removed. In addition, chroma scaling is not applied in case of a non-inter SCIPU. The prediction type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signaled flag before parsing the CUs in the SCIPU. In addition, a restriction on picture size is considered to avoid 2×2/2×4/4×2 intra chroma blocks at the corner of pictures by considering the picture width and height to be multiple of max (8, MinCbSizeY).

FIGS. 10A and 10B illustrate two SCIPU examples. The thickened lines indicate partitioning of chroma samples and the thin lines indicate partitioning of luma samples. The YUV format for the examples is 4:2:0. As shown in FIG. 10A, one chroma CB of 8×4 chroma samples and three luma CBs (4×8, 8×8, 4×8 luma CBs) form one SCIPU because the ternary tree (TT) split from the 8×4 chroma samples would result in chroma CBs smaller than 16 chroma samples. In other words, the smallest intra chroma CB in the shown SCIPU has 32 chroma samples without further splitting. The luma CBs are obtained by an additional TT split from 8×4 luma samples. In FIG. 10B, one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CBs smaller than 16 chroma samples.

To remove 2×N intra chroma in single tree, two restrictions may be applied including an extension of local dual tree and restriction of Combined Inter/Intra Prediction (CIIP) mode for chroma 2×N. In the first restriction, if a partition with the width of 4 and the split is binary vertical split or the width of 8 and the split is ternary vertical split, it is treated as a SCIPU. Following the principle restriction of SCIPU, the chroma components are not split in intra-SCIPU (all luma blocks are encoded using non-inter mode) and the non-split chroma block is coded using intra mode). For inter-SCIPU (all luma and chroma blocks are encoded using inter mode), the split of the chroma components is inherited from the luma component. In the second restriction, for 4×N CIIP blocks, the combination intra-inter prediction is only used for the luma component while only inter prediction is used for the chroma components.

These restrictions ensure that the width of intra chroma blocks is always larger than or equal to 4, and thus 2×N pixels intra process is removed. Such restriction makes the implementation of the video codec friendly for hardware implementations in terms of pipeline management and latency.

In VVC draft 6, besides intra prediction and inter prediction, a Combined Inter/Intra Prediction (CIIP) mode is also provided. CIIP, also called Multi-hypothesis intra-inter prediction, combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is removed from the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling.

The weights for combining predictions are described as follows. When DC or planar mode is selected or the Coding Block (CB) width or height is smaller than 4, equal weights are applied. For those CBs with CB width and height larger than or equal to 4, when horizontal/vertical mode is selected, one CB is first vertically/horizontally split into four equal-area regions. Each weight set, denoted as ($w\_intra_i$, $w\_inter_i$), where i is from 1 to 4 and ($w\_intra_1$, $w\_inter_1$)=(6, 2), ($w\_intra_2$, $w\_inter_2$)=(5, 3), ($w\_intra_3$, $w\_inter_3$)=(3, 5), and ($w\_intra_4$, $w\_inter_4$)=(2, 6), can be applied to a corresponding region. ($w\_intra_1$, $w\_inter_1$) is for the region closest to the reference samples and ($w\_intra_4$, $w\_inter_4$) is for the region farthest away from the reference samples. Then, the combined prediction can be calculated by summing up the two weighted predictions and right-shifting 3 bits. Moreover, the intra prediction mode for the intra hypothesis of predictors can be saved for the intra mode coding of the following neighboring CBs if they are intra coded.

Some of the specification text related to the second restriction (i.e. restrictions on 4×N CIIP blocks) is listed below.

In a decoding process for inter blocks whose output is an array predSamples of prediction samples, when ciip_flag[xCb][yCb] is equal to 1, the array predSamples of prediction samples is modified as follows:

If cIdx is equal to 0, the following applies:
The general intra sample prediction process as specified in clause 8.4.5.2.5 is invoked with the location (xTbCmp, yTbCmp) set equal to (xCb, yCb), the intra prediction mode predModeIntra set equal to IntraPredModeY[xCb][yCb], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntra$_L$.

The weighted sample prediction process for combined merge and intra prediction as specified in clause 8.5.6.7 is invoked with the location (xTbCmp, yTbCmp) set equal to (xCb, yCb), the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[xCb][yCb], and the colour component index cIdx as inputs, and the output is assigend to the (cbWidth)×(cbHeight) array predSamples.

Otherwise, if cIdx is equal to 1 and xCb/SubWidthC is greater than or equal to 4, the following applies:
The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to IntraPredModeY[xCb][yCb], the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntracb.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamplescb and predSamplesIntracb, respectively, the intra prediction mode predModeIntra set equal to IntraPredModeY[xCb][yCb], and the colour component index cIdx as inputs, and the output is assigend to the (cbWidth/SubWidthC)×(cbHeight/SubHeightC) array predSamples.

Otherwise (cIdx is equal to 2), if xCb/SubWidthC is greater than or equal to 4, the following applies:
The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to IntraPredModeY[xCb][yCb], the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntra$_{Cr}$.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamples$_{Cr}$ and predSamplesIntra$_{Cr}$, respectively, the intra prediction mode predModeIntra set equal to IntraPredModeY[xCb][yCb], and the colour component index cIdx as inputs, and the output is assigend to the (cbWidth/SubWidthC)×(cbHeight/SubHeightC) array predSamples.

In the above text, "if xCb/SubWidthC is greater than or equal to 4" is relevant to the 4×N CIIP blocks restriction.

SCIPU has avoided 2×2, 2×4, and 4×2 small chroma blocks. However, it creates a local dual tree, which is difficult to implement. The SCIPU proposed in VVC draft 6 may not justify its benefits. Further, disallowing 2×N chroma intra prediction in CIIP mode may not work when the color format is not 4:2:0, such as 4:2:2 or 4:4:4. Additionally, disallowing 2×N chroma in local dual tree may not work when the color format is not 4:2:0, such as 4:2:2 or 4:4:4. Moreover, it is helpful to derive minimum size of chroma coding blocks and/or minimum size of chroma quadtree nodes in intra dual tree mode.

The present disclosure provides various embodiments to ensure that a width of any reconstructed chroma CB intra-predicted from the coded video bitstream is greater than 2. In some embodiments, each side (both width and height) of any intra-predicted chroma CB is greater than 2. The embodiments are generally described in three groups: the first group of embodiments address situations when the CTU has a single tree structure (SCIPU not employed), the second group of embodiments address situations when the CTU has a single tree or a local dual tree structure (SCIPU allowed), and the third group of embodiments address situations when the CTU has dual tree structure (luma and chroma components have separate partitioning structures).

In the first group of embodiments where the CTU has a single tree structure, luma component of a current CU can be sub-partitioned into multiple PUs for intra prediction, whereas chroma component of the current CU can only have one PU when block area size of the chroma component is smaller than or equal to a threshold T1. T1 is a positive integer, such as 16 or 32. Here, PU is a basic unit for prediction.

A first sub-set of the first group of embodiments are described below. When the current CU is a leaf node in the single tree structure for intra prediction, the prediction information of the current CU may include an extended Intra Sub-Partitions (ISP) signal indicating whether the current CU is sub-partitioned based on an extended ISP type, the extended ISP type including at least one of a binary tree split, a ternary tree split, or a quad tree split. Here, the original ISP coding mode described in VVC draft 6 is extended to support binary tree split, and/or ternary tree split (TT), and/or quad-tree split (QT) for the intra-coded leaf CU node. To distinguish from the original ISP type, the added BT, TT, and QT type for ISP are named as extended ISP types. The extended ISP types are only allowed when single tree is employed for luma and chroma components of current slice/picture/frame, and the selection of BT, TT, QT, or the original ISP split type needs to be signaled and transmitted to the decoder.

The original ISP coding mode divides luma intra-predicted blocks vertically or horizontally into 2 or 4 sub-partitions depending on the block size dimensions, as shown in Table 3. Currently, the decision on whether to split into 2 or 4 partitions is dependent on the block size of coding unit.

TABLE 3

Number of sub-partitions depending on the block size

| Block Size | Number of Sub-Partitions |
| --- | --- |
| 4 × 4 | Not divided |
| 4 × 8 and 8 × 4 | 2 |
| All other cases | 4 |

Figure 11A:
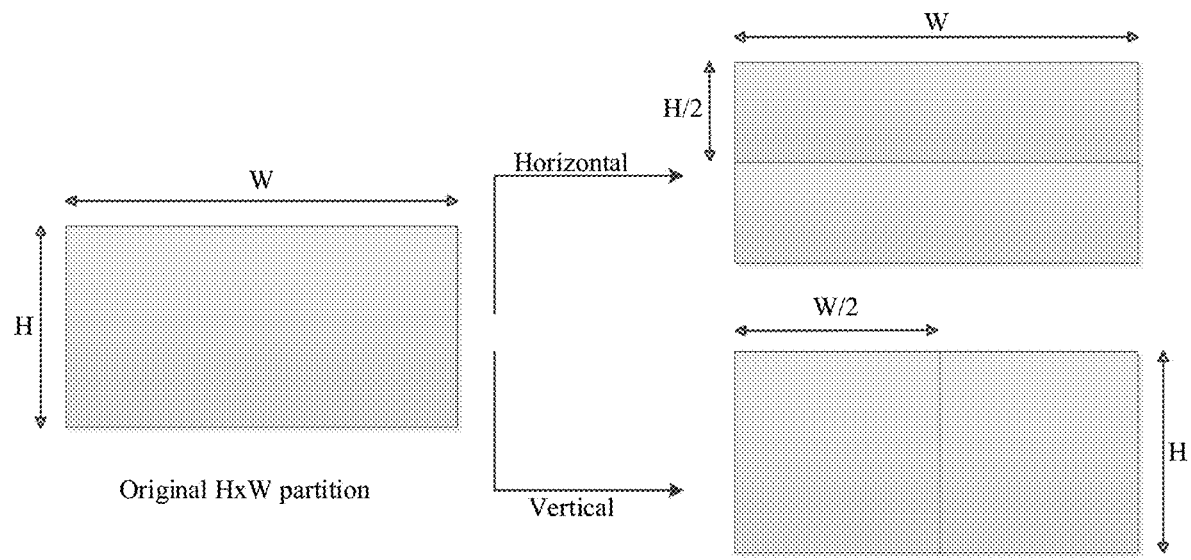
FIG. 11A and FIG. 11B show examples of the two possibilities of obtaining sub-partitions based on the original Intra Sub-Partitions (ISP) mode consistent with an embodiment of the present disclosure.
Figure 11B:
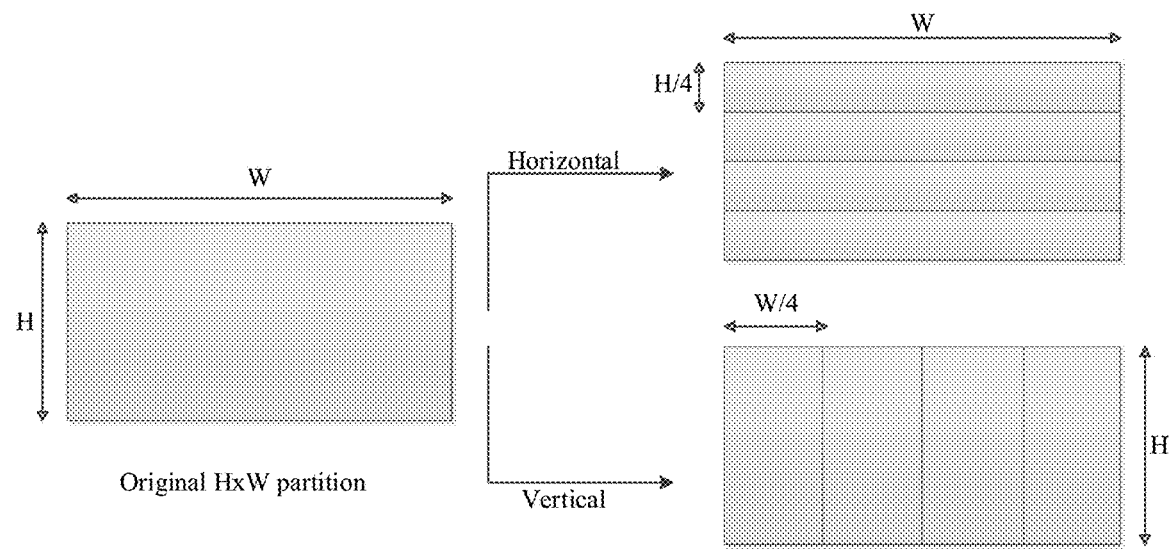

FIG. 11A and FIG. 11B show examples of the two possibilities of obtaining sub-partitions based on the original ISP mode. FIG. 11A illustrates example of division of 4×8 and 8×4 blocks. FIG. 11B illustrates example of division of all blocks except 4×8, 8×4 and 4×4 blocks. All sub-partitions fulfill the condition of having at least 16 samples. For chroma components, the original ISP is not applied.

At most, two bins are signaled for original ISP. The first bin (e.g., intra_subpartitions_mode_flag[x0][y0]) indicates whether original ISP is used. If the original ISP is used, another bin (intra_subpartitions_split_flag[x0][y0]) is further signaled to indicate the direction of the original ISP unless only one direction is available.

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition becomes available to generate the prediction of the next one, and such process can be repeated. All sub-partitions share the same intra mode.

The ISP algorithm is only tested with intra modes that are part of the Most Probable Mode (MPM) list. For this reason, if a block uses ISP, then the MPM flag is inferred to be one. Besides, if ISP is used for a certain block, then the MPM list is modified to exclude the DC mode and to prioritize horizontal intra modes for the ISP horizontal split and vertical intra modes for the vertical one. In ISP, each sub-partition can be regarded as a sub-TU since the transform and reconstruction is performed individually for each sub-partition.

In some embodiments, the BT, QT, and TT types of the extended ISP mode for sub-partitioning the current CU is similar to the BT, QT, and TT for block partitioning.

In one embodiment, extended ISP types are only allowed when the area of the chroma component is less than or equal to TT1 and greater than or equal to TT2. TT1 and TT2 are both positive integers. The value of TT1 and TT2 is dependent on the YUV format. For example, TT1 is set equal to 32 and TT2 is set equal to 16 when YUV format is equal to YUV420; TT1 and TT2 are both set equal to 16 when YUV format is equal to YUV422; TT1 and TT2 are both set equal to 8 when YUV format is equal to YUV422.

In one embodiment, each sub-partition of the current CU obtained based on any of the extended ISP types has an individual prediction mode. In one example, each sub-partition has its own intra prediction mode both for the original and extended ISP types. In another example, each sub-partition has its own intra prediction mode for the extended ISP types whereas all the sub-partitions share the same intra prediction mode for the original ISP types. In yet another example, it is restricted that the sub-partitions cannot have the same intra prediction mode.

In another embodiment, when extended ISP types are used for luma component, the DM mode for chroma component is set as equaling the collocated luma intra prediction mode at position [xCb+cbWidth/2, yCb+cbHeight/2], wherein (xCb, yCb) specifying the top-left sample of the current chroma coding block relative to the top left luma sample of the current picture, cbWidth specifying the width of the current coding block in luma samples, and cbHeight specifying the height of the current coding block in luma samples. In one example, when extended BT or TT ISP types are used for luma component, the intra prediction mode of the second partition in current luma CU is used as the DM mode for chroma component. In another example, when extended QT ISP types are used for luma component, the intra prediction mode of the fourth partition in current luma CU is used as the DM mode for chroma component.

In one embodiment, when the current CU is sub-partitioned based on the extended ISP type, the prediction information further includes a multiple transform set (MTS) flag and an MTS index for each sub-partition of the current CU. In other words, MTS is allowed for the extended ISP types, and the MTS flag and MTS index need to be signaled for each sub-partition when the extended ISP types are used.

In one embodiment, when the current CU is sub-partitioned based on the extended ISP type, the prediction information includes a value indicating that Low Frequency Non-Separable Transform (LFNST) is not applied for the current CU at the decoder. In other words, LFNST is disallowed for the extended ISP types, which means that LFNST index does not need to be signaled and is derived as a value.

In one embodiment, when width of current CU is smaller than 8, extended vertical BT for ISP is not allowed; when height of current CU is smaller than 8, extended horizontal BT for ISP is not allowed.

In one embodiment, when width of current CU is smaller than 16, extended vertical TT for ISP is not allowed; when height of current CU is smaller than 16, extended horizontal TT for ISP is not allowed.

In one embodiment, when a width of the current CU is not equal to a height of the current CU, the current CU is not allowed to be partitioned based on the quad-tree split of the extended ISP type.

In one embodiment, Multiple Reference Line (MRL), Matrix based Intra Prediction (MIP) or Residual differential pulse coded modulation (BDPCM) can be applied to sub-partitions of the current CU obtained based on the extended ISP type. For example, ISP mode flag is signaled before the mode flags of MRL, MIP and BDPCM. When the original ISP split type is selected, then MRL, MIP and BDPCM are all disallowed. Otherwise, when the extended ISP type is selected, MRL, MIP and BDPCM can be allowed.

Figure 12:
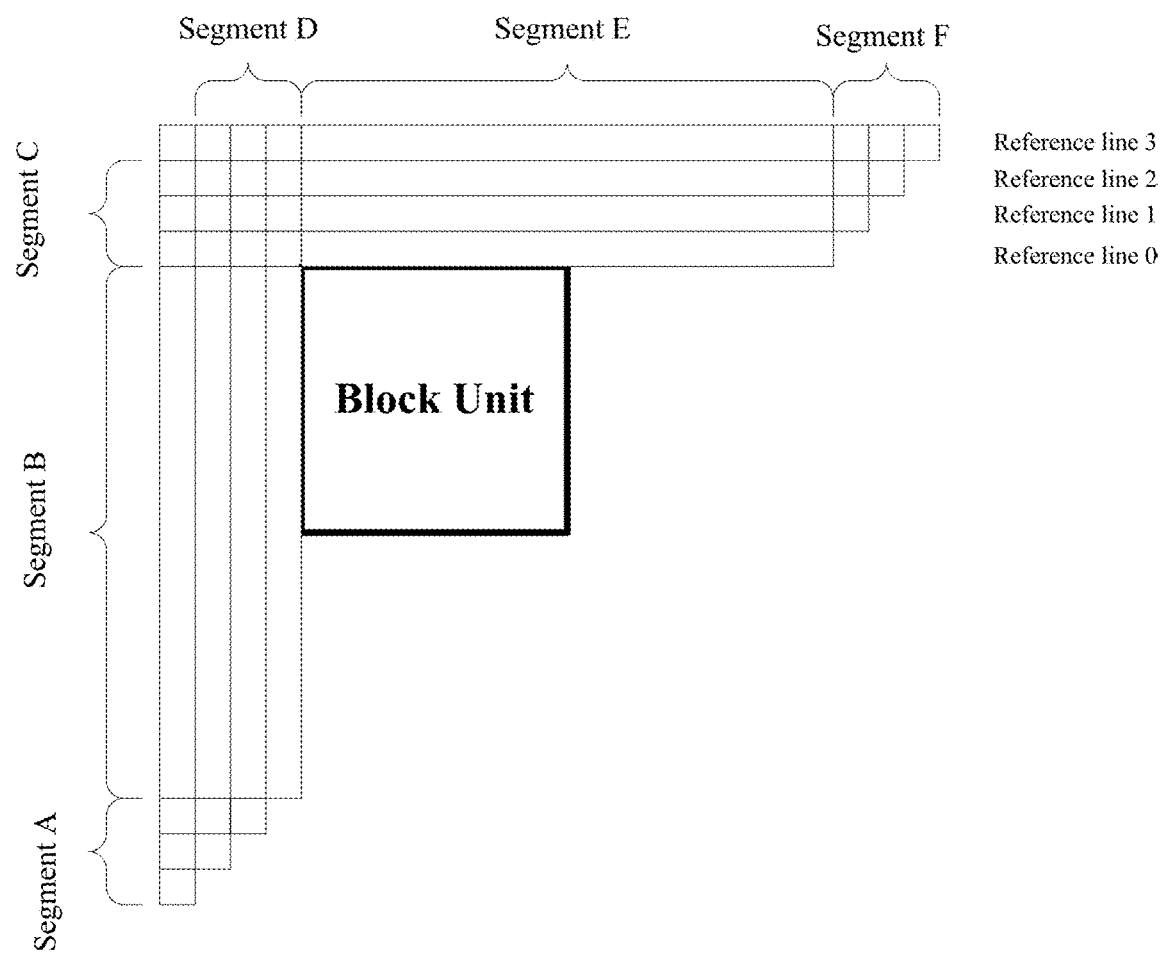
FIG. 12 illustrates an example of four reference lines adjacent to a coding block unit consistent with an embodiment of the present disclosure.

Multi-line intra prediction (also known as MRL prediction) uses more reference lines for intra prediction, and encoder decides and signals which reference line is used to generate the intra predictor. To be specific, reference line 0, 1, and 3 can be used, and reference line 2 is excluded. The reference line index is signaled before intra prediction modes, and only the most probable modes are allowed in case a nonzero reference line index is signaled. FIG. 12 illustrates an example of four reference lines adjacent to a coding block unit. As shown in FIG. 12, an example of 4 reference lines is depicted, where each reference line is composed of six segments, i.e., Segment A to F, together with the top-left reference sample. In addition, Segment A and F are padded with the closest samples from Segment B and E, respectively.

In one embodiment, when extended BT, TT, and QT split for ISP are all allowed and ISP flag is true, then one flag, called qtPartitionFlag, is first signaled to indicate whether current coding unit is quad-tree split into 4 sub-partitions or not. If qtPartitionFlag is false, another flag, called intra_subpartitions_split_flag, is signaled to indicate whether current coding unit is vertically split or horizontally split. After that, another flag, called intra_subpartitions_bt_flag, is signaled to indicate whether current coding unit is split into 2 partitions or not. If intra_subpartitions_bt_flag is false, another flag, called intra_subpartitions_tt_flag, is further signaled to indicate whether current coding unit is split into 3 partitions or 4 partitions.

In one embodiment, when extended BT and TT split for ISP are allowed and ISP flag is true, one flag, called intra_subpartitions_split_flag, is signaled to indicate whether current coding unit is vertically split or horizontally split. After that, another flag, called intra_subpartitions_bt_flag, is signaled to indicate whether current coding unit is split into 2 partitions or not. If intra_subpartitions_bt_flag is false, another flag, called intra_subpartitions_tt_flag, is further signaled to indicate whether current coding unit is split into 3 partitions or 4 partitions.

In one embodiment, when extended BT and QT split for ISP are allowed and ISP flag is true, one flag, called qtPartitionFlag, is first signaled to indicate whether current coding unit is quad-tree split into 4 sub-partitions or not. If qtPartitionFlag is false, another flag, called intra_subpartitions_split_flag, is signaled to indicate whether current coding unit is vertically split or horizontally split. After that, another flag, called intra_subpartitions_bt_flag, is signaled to indicate whether current coding unit is split into 2 partitions or not.

In one embodiment, when only extended BT split for ISP is allowed and ISP flag is true, one flag, called intra_subpartitions_split_flag, is signaled to indicate whether current coding unit is vertically split or horizontally split. After that, another flag, called intra_subpartitions_bt_flag, is signaled to indicate whether current coding unit is split into 2 partitions or not.

Table 4 shows part of a coding unit syntax related to employing the extended ISP type according to one embodiment from the first sub-set of the first group of embodiments. Semantics of the coding unit syntax are explained following Table 4.

TABLE 4

| Coding unit syntax for extended ISP | |
|---|---|
| coding_unit( x0, y0, cbWidth, cbHeight, cqtDepth, treeType, modeType ) { | Descriptor |
|   chType = treeType = = DUAL_TREE_CHROMA? 1 : 0 | |
|   if( slice_type != I \| \| sps_ibc_enabled_flag \| \| sps_palette_enabled_flag) { | |
|     if( treeType != DUAL_TREE_CHROMA && | |
|     !( ( ( cbWidth = = 4 && cbHeight = = 4 ) ) | |
|     && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|     && !( ( cbWidth / SubWidthC ) * ( cbHeight / SubHeightC ) <= 8 \| \| (cbWidth = = 4 && | |
| cbHeight = = 4) ) ) | |
|       pred_mode_flag | ae(v) |
|     if( ( ( slice_type = = I && cu_skip_flag[ x0 ][ y0 ] = =0 && ! (treeType = = SINGLE_TREE | |
|     && ( cbWidth / SubWidthC ) * ( cbHeight / SubHeightC ) <= 8)) \| \| | |
|     ( slice_type != I && ( CuPredMode[ chType ][ x0 ][ y0 ] != MODE_INTRA \| \| | |
|     ( cb_Width = = 4 && cbHeight = = 4 && cu_skip_flag[ x0 ][ y0 ] = = 0 ) ) ) ) && | |
|     cbWidth <= 64 && cbHeight <= 64 && | |
|     sps_ibc_enabled_flag && treeType != DUAL_TREE_CHROMA ) | |
|       pred_mode_ibc_flag | ae(v) |
|     if( ( ( ( slice_type = = I \| \| ( cbWidth = = 4 && cbHeight = = 4 ) \| \| sps_ibc_enabled_flag ) && | |
|     CuPredMode[ x0 ][ y0 ] = = MODE_INTRA ) \| \| | |

TABLE 4-continued

Coding unit syntax for extended ISP

| coding_unit( x0, y0, cbWidth, cbHeight, cqtDepth, treeType, modeType ) { | Descriptor |
|---|---|
|       ( slice_type != I && !( cbWidth = = 4 && cbHeight = = 4 ) && !sps_ibc_enabled_flag | |
|       && CuPredMode[ x0 ][ y0 ] != MODE_INTRA ) ) && sps_palette_enabled_flag && | |
|       cbWidth <= 64 && cbHeight <= 64 && && cu_skip_flag[ x0 ][ y0 ] = = 0 && | |
|       modeType != MODE_INTER ) | |
|     pred_mode_plt_flag | ae(v) |
| } | |
| if( CuPredMode[ chType ][ x0 ][ y0 ] = = MODE_INTRA \|\| | |
|   CuPredMode[ chType ][ x0 ][ y0 ] = = MODE_PLT ) { | |
|   if( treeType = = SINGLE_TREE \|\| treeType = = DUAL_TREE_LUMA ) { | |
|     if( pred_mode_plt_flag ) { | |
|       if( treeType = = DUAL_TREE_LUMA ) | |
|         palette_coding( x0, y0, cbWidth, cbHeight, 0, 1 ) | |
|       else /* SINGLE_TREE */ | |
|         palette_coding( x0, y0, cbWidth, cbHeight, 0, 3 ) | |
|     } else { | |
|       if( sps_bdpcm_enabled_flag && | |
|         cbWidth <= MaxTsSize && cbHeight <= MaxTsSize ) | |
|         intra_bdpcm_flag | ae(v) |
|       if( intra_bdpcm_flag ) | |
|         intra_bdpcm_dir_flag | ae(v) |
|       else { | |
|         if( sps_mip_enabled_flag && | |
|           ( Abs( Log2( cbWidth ) − Log2( cbHeight ) ) <= 2 ) && | |
|           cbWidth <= MaxTbSizeY && cbHeight <= MaxTbSizeY ) | |
|         intra_mip_flag[ x0 ][ y0 ] | ae(v) |
|         if( intra_mip_flag[ x0 ][ y0 ] ) | |
|           intra_mip_mode[ x0 ][ y0 ] | ae(v) |
|         else { | |
|           if( sps_mrl_enabled_flag && ( ( y0 % CtbSizeY ) > 0 ) ) | |
|             intra_luma_ref_idx[ x0 ][ y0 ] | ae(v) |
|           if ( sps_isp_enabled_flag && intra_luma_ref_idx[ x0 ][ y0 ] = = 0 && | |
|             ( cbWidth <= MaxTbSizeY && cbHeight <= MaxTbSizeY ) && | |
|             ( cbWidth * cbHeight > MinTbSizeY * MinTbSizeY ) ) | |
|             intra_subpartitions_mode_flag[ x0 ][ y0 ] | ae(v) |
|           if( intra_subpartitions_mode_flag[ x0 ][ y0 ] = = 1 ){ | |
|             intra_subpartitions_split_flag[ x0 ][ y0 ] | ae(v) |
|           if ( treeType = = SINGLE_TREE && | |
|             ( cbWidth / SubWidthC ) * ( cbHeight / SubHeightC ) <= 32 ) | |
|             intra_subpartitions_bt_flag[ x0 ][ y0 ] | ae(v) |
|           } | |
|             for( partPuIdx = 0; partPuIdx < NumIntraPuPartitions; partPuIdx++ ){ | |
|               if( intra_luma_ref_idx[ x0 + x_offset ][ y0 + y_offset ] = = 0 ) | |
|                 intra_luma_mpm_flag[ x0 + x_offset ][ y0 + y_offset ] | ae(v) |
|               if( intra_luma_mpm_flag[ x0 + x_offset ][ y0 + y_offset ] ) { | |
|                 if( intra_luma_ref_idx[ x0 + x_offset ][ y0 + y_offset ] = = 0 ) | |
|                   intra_luma_not_planar_flag[ x0 + x_offset ][ y0 + y_offset ] | ae(v) |
|                 if( intra_luma_not_planar_flag[ x0 + x_offset ][ y0 + y_offset ] ) | |
|                   intra_luma_mpm_idx[ x0 + x_offset ][ y0 + y_offset ] | ae(v) |
|               } else | |
|                 intra_luma_mpm_remainder[ x0 + x_offset ][ y0 + y_offset ] | ae(v) |
|             } | |
|           } | |
|         } | |
|       } | |
|     } | |
|   if( ( treeType = = SINGLE_TREE \|\| treeType = = DUAL_TREE_CHROMA ) && | |
|     ChromaArrayType != 0 ) { | |
|     if ( pred_mode_plt_flag && treeType = = DUAL_TREE_CHROMA ) | |
|       palette_coding( x0, y0, cbWidth / SubWidthC, cbHeight / SubHeightC, 1, 2 ) | |
|     else { | |
|       if( CclmEnabled ) | |
|         cclm_mode_flag | ae(v) |
|       if( cclm_mode_flag ) | |
|         cclm_mode_idx | ae(v) |
|       else | |
|         intra_chroma_pred_mode | ae(v) |
|     } | |
|   } | |
| } else if( treeType != DUAL_TREE_CHROMA ) { /* MODE_INTER or MODE_IBC */ | |
|   if( cu_skip_flag[ x0 ][ y0 ] = = 0 ) | |
|     general_merge_flag[ x0 ][ y0 ] | ae(v) |
|   if( general_merge_flag[ x0 ][ y0 ] ) { | |
|     merge_data( x0, y0, cbWidth, cbHeight, chType ) | |
|   } else if ( CuPredMode[ chType ][ x0 ][ y0 ] = = MODE_IBC ) { | |
|     mvd_coding( x0, y0, 0, 0 ) | |
|     if( MaxNumIbcMergeCand > 1 ) | |

TABLE 4-continued

Coding unit syntax for extended ISP

| coding_unit( x0, y0, cbWidth, cbHeight, cqtDepth, treeType, modeType ) { | Descriptor |
|---|---|
|     mvp_l0_flag[ x0 ][ y0 ] | ae(v) |
|     if( sps_amvr_enabled_flag &&<br>      ( MvdL0[ x0 ][ y0 ][ 0 ] != 0 \|\| MvdL0[ x0 ][ y0 ][ 1 ] != 0 ) ) {<br>      amvr_precision_idx[ x0 ][ y0 ]<br>    } | ae(v) |

The parameter intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions. When intra_subpartitions_mode_flag[x0][y0] is not present, it is inferred to be equal to 0.

The parameter intra_subpartitions_split_flag[x0][y0] specifies whether the intra subpartitions split type is horizontal or vertical. When intra_subpartitions_split_flag[x0][y0] is not present, it is inferred as follows: If cbHeight is greater than MaxTbSizeY, intra_subpartitions_split_flag[x0][y0] is inferred to be equal to 0; Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 5. IntraSubPartitionsSplitType is derived as follows: If intra_subpartitions_mode_flag[x0][y0] is equal to 0, IntraSubPartitionsSplitType is set equal to 0; Otherwise, the IntraSubPartitionsSplitType is set equal to 1+intra_subpartitions_split_flag[x0][y0].

TABLE 5

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The parameter intra_subpartitions_bt_flag[x0][y0] specifies whether current coding unit is partitioned into two or four partitions. When intra_subpartitions_bt_flag[x0][y0] is not present, it is inferred to be equal to 0.

The variable NumIntraPuPartitions specifies the number of prediction block partitions into which an intra luma coding unit is divided. NumIntraPuPartitions is derived as follows: If intra_subpartitions_bt_flag[x0][y0] is equal to 1, NumIntraPuPartitions is set equal to 2. Otherwise, NumIntraPuPartitions is set equal to 1.

The variable x_offset and y_offset specify the (x,y) coordinate the top-left sample in PU partition relative to the (x,y) coordinate the top-left sample in CU partition. x_offset and y_offset are derived as follows:
    If intra_subpartitions_bt_flag[x0][y0] is not equal to 1, x_offset and y_offset are both set equal to 0.
    Otherwise, x_offset and y_offset are derived as follows:
        If intra_subpartitions_split_flag[x0][y0] is equal to 1, x_offset is set equal to partPuIdx*cbWidth/2 and y_offset is set equal to 0.
        Otherwise, x_offset is set equal to 0 and y_offset is set equal to partPuIdx*cbHeight/2.

The variable NumIntraSubPartitions specifies the number of transform block subpartitions into which an intra luma coding block is divided. NumIntraSubPartitions is derived as follows:
    If IntraSubPartitionsSplitType is equal to ISP_NO_SPLIT, NumIntraSubPartitions is set equal to 1.
    Otherwise, if one of the following conditions is true, NumIntraSubPartitions is set equal to 2:
        cbWidth is equal to 4 and cbHeight is equal to 8,
        cbWidth is equal to 8 and cbHeight is equal to 4,
        intra_subpartitions_bt_flag[x0][y0] is equal to 1.
    Otherwise, NumIntraSubPartitions is set equal to 4.

Table 6 shows part of a coding unit syntax related to employing the extended ISP type according to another embodiment from the first sub-set of the first group of embodiments. Semantics of the coding unit syntax shown in Table 6 are the same as those for the coding unit syntax shown in Table 4. The difference of the two embodiments lies in the signaling positions of the extended ISP type.

TABLE 6

Coding unit syntax for extended ISP

| | Descriptor |
|---|---|
| coding_unit( x0, y0, cbWidth, cbHeight, cqtDepth, treeType, modeType ) {<br>  chType = treeType = = DUAL_TREE_CHROMA? 1 : 0<br>  if( slice_type != I \|\| sps_ibc_enabled_flag \|\| sps_palette_enabled_flag) {<br>    if( treeType != DUAL_TREE_CHROMA &&<br>      !( ( ( cbWidth = = 4 && cbHeight = = 4 ) \|\| modeType = = MODE_TYPE_INTRA )<br>      && !sps_ibc_enabled_flag ) )<br>      cu_skip_flag[ x0 ][ y0 ]<br>    ......<br>    ......<br>  }<br>  if( CuPredMode[ chType ][ x0 ][ y0 ] = = MODE_INTRA \|\|<br>    CuPredMode[ chType ][ x0 ][ y0 ] = = MODE_PLT ) {<br>    if( treeType = = SINGLE_TREE \|\| treeType = = DUAL_TREE_LUMA ) {<br>      if( pred_mode_plt_flag ) {<br>        if( treeType = = DUAL_TREE_LUMA ) | ae(v) |

TABLE 6-continued

Coding unit syntax for extended ISP

| | Descriptor |
|---|---|
|       palette_coding( x0, y0, cbWidth, cbHeight, 0, 1 ) | |
|     else /* SINGLE_TREE */ | |
|       palette_coding( x0, y0, cbWidth, cbHeight, 0, 3 ) | |
|   } else { | |
|     if ( sps_isp_enabled_flag && intra_luma_ref_idx[ x0 ] [ y0 ] = = 0 && | |
|         ( cbWidth <= MaxTbSizeY && cbHeight <= MaxTbSizeY ) && | |
|         ( cbWidth * cbHeight > MinTbSizeY * MinTbSizeY ) ) | |
|       intra_subpartitions_mode_flag[ x0 ][ y0 ] | ae(v) |
|     if( intra_subpartitions_mode_flag[ x0 ][ y0 ] = = 1 ){ | |
|       intra_subpartitions_split_flag[ x0 ][ y0 ] | ae(v) |
|   if ( treeType = = SINGLE_TREE && | |
|     ( cbWidth / SubWidthC ) * ( cbHeight / SubHeightC ) <= 32 ) | |
|     intra_subpartitions_bt_flag[ x0 ][ y0 ] | ae(v) |
|   } | |
|   for( partPuIdx = 0; partPuIdx < NumIntraPuPartitions; partPuIdx++ ){ | |
|     if( sps_bdpcm_enabled_flag && | |
|       cbWidth <= MaxTsSize && cbHeight <= MaxTsSize ) | |
|       intra_bdpcm_flag | ae(v) |
|     if( intra_bdpcm_flag ) | |
|       intra_bdpcm_dir_flag | ae(v) |
|     else { | |
|       if( sps_mip_enabled_flag && | |
|         ( Abs( Log2( cbWidth ) − Log2( cbHeight) ) <= 2 ) && | |
|         cbWidth <= MaxTbSizeY && cbHeight <= MaxTbSizeY ) | |
|       intra_mip_flag[ x0 ][ y0 ] | ae(v) |
|     if( intra_mip_flag[ x0 ][ y0 ] ) | |
|       intra_mip_mode[ x0 ][ y0 ] | ae(v) |
|     else { | |
|       if( intra_luma_ref_idx[ x0 + x_offset ][ y0 + y_offset ] = = 0 ) | |
|         intra_luma_mpm_flag[ x0 + x_offset ][ y0 + y_offset ] | |
|       if( intra_luma_mpm_flag[ x0 + x_offset ][ y0 + y_offset ] ) { | |
|         if( intra_luma_ref_idx[ x0 + x_offset ][ y0 + y_offset ] = = 0 ) | |
|           intra_luma_not_planar_flag[ x0 + x_offset ][ y0 + y_offset ] | ae(v) |
|         if( intra_luma_not_planar_flag[ x0 + x_offset ][ y0 + y_offset ] ) | |
|           intra_luma_mpm_idx[ x0 + x_offset ][ y0 + y_offset ] | ae(v) |
|       } else | |
|         intra_luma_mpm_remainder[ x0 + x_offset ][ y0 + y_offset ] | ae(v) |
|     } | |
|     } | |
|     } | |
|   } | |
| } | |

A second sub-set of the first group of embodiments are described below. A current CU can be split into multiple prediction units (PU) when single tree structure is employed for luma and chroma components of the current CTU or slice, and chroma area size of the current CU is smaller than or equal to a threshold T1. T1 is a positive integer, such as 16 or 32. Here, PU is the basic unit for prediction. The second sub-set of the first group of embodiments may be implemented without defining the extended ISP type as discussed in the first sub-set of the first group of embodiments.

In one embodiment, when the current CU has multiple prediction units, transform unit size is always equal to prediction unit size. For example, when the luma component of the current CU is sub-partitioned into multiple PUs, a size of each transform unit equals a size of its corresponding PU.

In another embodiment, when luma CU (i.e., luma component of the current CU) has been split into N PUs, N is a positive integer, such as 2, 3, or 4, chroma coding block flag (cbf) is signaled between the signaling of luma cbf of (N−1)th PU and Nth PU.

In one embodiment, when current CU can split into multiple PUs, one flag, namely puSplitFlag, is signaled to indicate whether current CU is divided into multiple PUs or not. When puSplitFlag is true, current CU is divided into at least two PUs; otherwise, current CU only contains one PU, and PU size is equal to CU size.

In one example for puSplitFlag, the flag is signaled before skip flag: when puSplitFlag is true, skip flag is not signaled and derived as false; otherwise, skip flag can be signaled. In another example, when puSplitFlag is true, it is assumed all PUs are intra so that no inter information needs to be signaled. In another example, puSplitFlag is only signaled for intra-coded CU whereas puSplitFlag is not signaled for inter-coded CU and derived as false.

In yet another example for puSplitFlag, BT, TT, and QT split are all allowed for current CU, when puSplitFlag is true, one flag, namely split_pu_qt_flag, is signaled to indicate whether current CU is quad-tree split into 4 equal-sized PUs. If split_pu_qt_flag is false, another flag, namely mtt_split_pu_vertical_flag, is signaled to indicate whether current CU is vertically split into 2 or 3 PUs. After that, another flag, namely mtt_split_pu_binary_flag, is used to indicate whether current CU is vertically or horizontally split into 2 PUs. In yet another example, BT and TT split are both allowed for current CU, when puSplitFlag is true, one flag, namely, mtt_split_pu_vertical_flag, is signaled to indicate whether current CU is vertically split into 2 or 3 PUs. After that, another flag, namely mtt_split_pu_binary_flag, is used to indicate whether current CU is vertically or horizontally split into 2 PUs. In yet another example, only BT split is allowed for current CU, when puSplitFlag is true, one flag, namely, mtt_split_pu_vertical_flag, is signaled to indicate whether current CU is vertically split into 2 PUs.

In one embodiment, when current CU is split into multiple PUs, ISP mode is not allowed for all the PUs within current CU. ISP mode can be allowed only when current CU contains one PU.

Tables 7-10 respectively show at least part of a coding unit syntax, a prediction unit syntax, a transform tree syntax, and a transform unit syntax for implementing one embodiment from the second sub-set of the first group of embodiments. Tables 7-10 demonstrate implementation of added PU split for small blocks in single tree structure. Related semantics are explained following the tables.

TABLE 7

Coding unit syntax of added PU split for small blocks in single tree

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag ) { | |
|     if( treeType != DUAL_TREE_CHROMA && | |
|       !( ( ( cbWidth = = 4 && cbHeight = = 4 ) \|\| modeType = = MODE_TYPE_INTRA ) | |
|       && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|       && !( cbWidth = = 4 && cbHeight = = 4 ) && modeType = = MODE_TYPE_ALL ) | |
|       pred_mode_flag | ae(v) |
|     if( ( ( ( slice_type = = I && cu_skip_flag[ x0 ][ y0 ] = =0 ) \|\| | |
|       ( slice_type != I &&( CuPredMode[ chType ][ x0 ][ y0 ] != MODE_INTRA \|\| | |
|         ( cbWidth = = 4 && cbHeight = = 4 && cu_skip_flag[ x0 ][ y0 ] = = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|     if( ( ( ( slice_type = = I \|\| ( cbWidth = = 4 && cbHeight = = 4 ) \|\| sps_ibc_enabled_flag ) && | |
|         CuPredMode[ x0 ][ y0 ] = = MODE_INTRA ) \|\| | |
|       ( slice_type != I && !( cbWidth = = 4 && cbHeight = = 4 ) && !sps_ibc_enabled_flag | |
|         && CuPredMode[ x0 ][ y0 ] != MODE_INTRA )) && sps_palette_enabled_flag && | |
|       cbWidth <= 64 && cbHeight <= 64 && && cu_skip_flag[ x0 ][ y0 ] = = 0 && | |
|       modeType != MODE_INTER ) | |
|       pred_mode_plt_flag | ae(v) |
|   } | |
|   if( ( allowPuSplitBtVer \|\| allowPuSplitBtHor \|\| allowPuSplitTtVer \|\| allowPuSplitTtHor \|\| allowPuSplitQT ) ) | |
|     split_pu_flag | ae(v) |
|   if( split_pu_flag ) { | |
|     if( ( allowPuSplitBtVer \|\| allowPuSplitBtHor \|\| allowPuSplitTtVer \|\| allowPuSplitTtHor ) && | |
|       allowPuSplitQT) | |
|       split_pu_qt_flag | ae(v) |
|     if( !split_pu_qt_flag ) { | |
|       if( ( allowPuSplitBtHor \|\| allowPuSplitTtHor ) && | |
|         ( allowPuSplitBtVer \|\| allowPuSplitTtVer ) ) | |
|         mtt_split_pu_vertical_flag | ae(v) |
|       if( ( allowPuSplitBtVer && allowPuSplitTtVer && mtt_split_cu_vertical_flag ) \|\| | |
|         ( allowPuSplitBtHor && allowPuSplitTtHor && !mtt_split_cu_vertical_flag ) ) | |
|         mtt_split_pu_binary_flag | ae(v) |
|     } | |
|     if( !split_pu_qt_flag ) { | |
|       if( MttSplitMode[ x0 ][ y0 ][ mttDepth ] = = SPLIT_BT_VER ) { | |
|         x1 = x0 + ( cbWidth / 2 ) | |
|         prediction_unit ( x0, y0, cbWidth / 2, cbHeight, cqtDepth, 0, treeType, 1) | |
|         prediction_unit ( x1, y0, cbWidth / 2, cbHeightY, cqtDepth, 1, treeType, 1) | |
|       } else if( MttSplitMode[ x0 ][ y0 ][ mttDepth ] = = SPLIT_BT_HOR ) { | |
|         y1 = y0 + ( cbHeight / 2 ) | |
|         prediction_unit ( x0, y0, cbWidth, cbHeight / 2, cqtDepth, 0, treeType, 1) | |
|         prediction_unit ( x0, y1, cbWidth, cbHeight / 2, cqtDepth, 1, treeType, 1) | |
|       } else if( MttSplitMode[ x0 ][ y0 ][ mttDepth ] = = SPLIT_TT_VER ) { | |
|         x1 = x0 + ( cbWidth / 4 ) | |
|         x2 = x0 + ( 3 * cbWidth / 4 ) | |
|         prediction_unit ( x0, y0, cbWidth / 4, cbHeight, cqtDepth, 0, treeType, 1) | |
|         prediction_unit ( x1, y0, cbWidth / 2, cbHeight, cqtDepth, 1, treeType, 1) | |
|         prediction_unit ( x2, y0, cbWidth / 4, cbHeight, cqtDepth, 2, treeType, 1) | |
|       } else { /* SPLIT_TT_HOR */ | |
|         y1 = y0 + ( cbHeight / 4 ) | |
|         y2 = y0 + ( 3 * cbHeight / 4 ) | |
|         prediction_unit ( x0, y0, cbWidth, cbHeight / 4, cqtDepth, 0, treeType, 1) | |
|         prediction_unit ( x0, y1, cbWidth, cbHeight / 2, cqtDepth, 1, treeType, 1) | |
|         prediction_unit ( x0, y2, cbWidth, cbHeight / 4, cqtDepth, 2, treeType, 1) | |
|       } | |
|     } else { | |
|       x1 = x0 + ( cbWidth / 2 ) | |
|       y1 = y0 + ( cbHeight / 2 ) | |
|       prediction_unit ( x0, y0, cbWidth / 2, cbHeight / 2, cqtDepth + 1, 0, treeType, 1) | |
|       prediction_unit ( x1, y0, cbWidth / 2, cbHeight / 2, cqtDepth + 1, 1, treeType, 1) | |

TABLE 7-continued

Coding unit syntax of added PU split for small blocks in single tree

| | Descriptor |
|---|---|
|       prediction_unit ( x0, y1, cbWidth / 2, cbHeight / 2, cqtDepth + 1, 2, treeType, 1)<br>      prediction_unit ( x1, y1, cbWidth / 2, cbHeight / 2, cqtDepth + 1, 3, treeType, 1)<br>    }<br>} else<br>  prediction_unit ( x0, y0, cbWidth, cbHeight, cqtDepth, 0, treeTypeCurr, 0 )<br>if( CuPredMode[ chType ][ x0 ][ y0 ] != MODE_INTRA && !pred_mode_plt_flag &&<br>    general_merge_flag[ x0 ][ y0 ] = = 0 )<br>  cu_cbf | ae(v) |
| if( cu_cbf && !split_pu_flag) {<br>  if( CuPredMode[ chType ][ x0 ][ y0 ] = = MODE_INTER && sps_sbt_enabled_flag<br>      && !ciip_flag[ x0 ][ y0 ] && !MergeTriangleFlag[ x0 ][ y0 ] ) {<br>    if( cbWidth <= MaxSbtSize && cbHeight <= MaxSbtSize ) {<br>      allowSbtVerH = cbWidth >= 8<br>      allowSbtVerQ = cbWidth >= 16<br>      allowSbtHorH = cbHeight >= 8<br>      allowSbtHorQ = cbHeight >= 16<br>      if( allowSbtVerH \|\| allowSbtHorH \|\|   allowSbtVerQ \|\| allowSbtHorQ )<br>        cu_sbt_flag | ae(v) |
|     }<br>    if( cu_sbt_flag ) {<br>      if( ( allowSbtVerH \|\| allowSbtHorH ) && ( allowSbtVerQ \|\| allowSbtHorQ) )<br>        cu_sbt_quad_flag | ae(v) |
|       if( ( cu_sbt_quad_flag && allowSbtVerQ && allowSbtHorQ ) \|\|<br>        ( !cu_sbt_quad_flag && allowSbtVerH && allowSbtHorH ) )<br>        cu_sbt_horizontal_flag | ae(v) |
|       cu_sbt_pos_flag | ae(v) |
|     }<br>  }<br>}<br>LfnstDcOnly = 1<br>LfnstZeroOutSigCoeffFlag = 1<br>transform_tree( x0, y0, cbWidth, cbHeight, treeType, split_pu_flag )<br>lfnstWidth = ( treeType = = DUAL_TREE_CHROMA ) ? cbWidth / SubWidthC<br>            : cbWidth<br>lfnstHeight = (treeType = = DUAL_TREE_CHROMA ) ? cbHeight / SubHeightC<br>            : cbHeight<br>if( Min( lfnstWidth, lfnstHeight ) >= 4 && sps_lfnst_enabled_flag = = 1 &&<br>    CuPredMode[ chType ][ x0 ][ y0 ] = = MODE_INTRA && !split_pu_flag &&<br>    IntraSubPartitionsSplitType = = ISP_NO_SPLIT &&<br>    ( !intra_mip_flag[ x0 ][ y0 ] \|\| Min( lfnstWidth, lfnstHeight) >= 16 ) &&<br>    tu_mts_idx[ x0 ][ y0 ] = = 0 && Max( cbWidth, cbHeight) <= MaxTbSizeY) {<br>  if( LfnstDcOnly = = 0 && LfnstZeroOutSigCoeffFlag = = 1 )<br>    lfnst_idx[ x0 ][ y0 ]<br>} | ae(v) |

TABLE 8 prediction unit syntax of added PU split for small blocks in single tree

| | Descriptor |
|---|---|
| prediction_unit( x0, y0, cbWidth, cbHeight, cqtDepth, partIdx, treeTypeCurr, isPuSplit ) {<br>  if( CuPredMode[ chType ][ x0 ][ y0 ] = = MODE_INTRA \|\|<br>    CuPredMode[ chType ][ x0 ][ y0 ] = = MODE_PLT ) {<br>    if( treeType = = SINGLE_TREE \|\| treeType = = DUAL_TREE_LUMA ) {<br>      if( pred_mode_plt_flag ) {<br>        if( treeType = = DUAL_TREE_LUMA )<br>          palette_coding( x0, y0, cbWidth, cbHeight, 0, 1 )<br>        else /* SINGLE_TREE */<br>          palette_coding( x0, y0, cbWidth, cbHeight, 0, 3 )<br>    } else {<br>      if( sps_bdpcm_enabled_flag &&<br>        cbWidth <= MaxTsSize && cbHeight <= MaxTsSize )<br>        intra_bdpcm_flag | ae(v) |
|       if( intra_bdpcm_flag )<br>        intra_bdpcm_dir_flag | ae(v) |
|       else {<br>        if( sps_mip_enabled_flag &&<br>          ( Abs( Log2( cbWidth ) − Log2( cbHeight ) ) <= 2 &&<br>          cbWidth <= MaxTbSizeY && cbHeight <= MaxTbSizeY )<br>        intra_mip_flag[ x0 ][ y0 ] | ae(v) |
|         if( intra_mip_flag[ x0 ][ y0 ] )<br>          intra_mip_mode[ x0 ][ y0 ]<br>        else { | ae(v) |

TABLE 8-continued prediction unit syntax of added PU split for small blocks in single tree

| | Descriptor |
|---|---|
|      if( sps_mrl_enabled_flag && ( ( y0 % CtbSizeY ) > 0 ) ) | |
|       intra_luma_ref_idx[ x0 ][ y0 ] | ae(v) |
|      if ( sps_isp_enabled_flag && isPuSplit == 0 && intra_luma_ref_idx[ x0 ][ y0 ] = = 0 && | |
|       ( cbWidth <= MaxTbSizeY && cbHeight <= MaxTbSizeY ) && | |
|       ( cbWidth * cbHeight > MinTbSizeY * MinTbSizeY ) ) | |
|       intra_subpartitions_mode_flag[ x0 ][ y0 ] | ae(v) |
|      if( intra_subpartitions_mode_flag[ x0 ][ y0 ] = = 1 ) | |
|       intra_subpartitions_split_flag[ x0 ][ y0 ] | ae(v) |
|      if( intra_luma_ref_idx[ x0 ][ y0 ] = = 0 ) | |
|       intra_luma_mpm_flag[ x0 ][ y0 ] | ae(v) |
|      if( intra_luma_mpm_flag[ x0 ][ y0 ] ) { | |
|       if( intra_luma_ref_idx[ x0 ][ y0 ] = = 0 ) | |
|        intra_luma_not_planar_flag[ x0 ][ y0 ] | ae(v) |
|       if( intra_luma_not_planar_flag[ x0 ][ y0 ] ) | |
|        intra_luma_mpm_idx[ x0 ][ y0 ] | ae(v) |
|      } else | |
|       intra_luma_mpm_remainder[ x0 ][ y0 ] | ae(v) |
|     } | |
|    } | |
|   } | |
|  } | |
|  if( ( treeType = = SINGLE_TREE || treeType = = DUAL_TREE_CHROMA ) && | |
|    ChromaArrayType != 0 ) { | |
|   if ( pred_mode_plt_flag && treeType = = DUAL_TREE_CHROMA ) | |
|    palette_coding( x0, y0, cbWidth / SubWidthC, cbHeight / SubHeightC, 1, 2 ) | |
|   else if (partIdx == 0){ | |
|    if( CclmEnabled ) | |
|     cclm_mode_flag | ae(v) |
|    if( cclm_mode_flag ) | |
|     cclm_mode_idx | ae(v) |
|    else | |
|     intra_chroma_pred_mode | ae(v) |
|   } | |
|  } | |

TABLE 9 transform tree syntax of added PU split for small blocks in single tree

| | Descriptor |
|---|---|

```
transform_tree( x0, y0, tbWidth, tbHeight, treeType, chType, isPuSplit ) {
  InferTuCbfLuma = 1
  if( IntraSubPartitionsSplitType = = ISP_NO_SPLIT && !cu_sbt_flag ) {
          ......
          ......
  } else if( IntraSubPartitionsSplitType = = ISP_HOR_SPLIT ) {
    trafoHeight = tbHeight / NumIntraSubPartitions
    for( partIdx = 0; partIdx < NumIntraSubPartitions; partIdx++ )
      transform_unit( x0, y0 + trafoHeight * partIdx, tbWidth, trafoHeight, treeType, partIdx, 0 )
  } else if( IntraSubPartitionsSplitType = = ISP_VER_SPLIT ) {
    trafoWidth = tbWidth / NumIntraSubPartitions
    for( partIdx = 0; partIdx < NumIntraSubPartitions; partIdx++ )
      transform_unit( x0 + trafoWidth * partIdx, y0, trafoWidth, tbHeight, treeType, partIdx, 0 )
  } if(isPuSplit) {
      if( MttSplitMode[ x0 ][ y0 ][ mttDepth ] = = SPLIT_BT_VER ) {
        x1 = x0 + ( cbWidth / 2 )
        transform_unit ( x0, y0, cbWidth / 2, cbHeight, treeType, 0, chType)
        transform_unit ( x1, y0, cbWidth / 2, cbHeightY, treeType, 1, chType)
      } else if( MttSplitMode[ x0 ][ y0 ][ mttDepth ] = = SPLIT_BT_HOR ) {
        y1 = y0 + ( cbHeight / 2 )
        transform_unit ( x0, y0, cb Width, cbHeight / 2, treeType, 0, chType)
        transform_unit ( x0, y1, cbWidth, cbHeight / 2, treeType, 1, chType)
      } else if( MttSplitMode[ x0 ][ y0 ][ mttDepth ] = = SPLIT_TT_VER ) {
        x1 = x0 + ( cbWidth / 4 )
        x2 = x0 + ( 3 * cbWidth / 4 )
        transform_unit ( x0, y0, cbWidth / 4, cbHeight, treeType, 0, chType)
        transform_unit ( x1, y0, cbWidth / 2, cbHeight, treeType, 1, chType)
        transform_unit ( x2, y0, cbWidth / 4, cbHeight, treeType, 2, chType)
      } else if( MttSplitMode[ x0 ][ y0 ][ mttDepth ] = = SPLIT_TT_HOR ) {
        y1 = y0 + ( cbHeight / 4 )
        y2 = y0 + ( 3 * cbHeight / 4 )
```

TABLE 9-continued transform tree syntax of added PU split for small blocks in single tree

| | Descriptor |
|---|---|
| ``` 
        transform_unit ( x0, y0, cbWidth, cbHeight / 4, treeType, 0, chType)
        transform_unit ( x0, y1, cbWidth, cbHeight / 2, treeType, 1, chType)
        transform_unit ( x0, y2, cbWidth, cbHeight / 4, treeType, 2, chType)
      } else { /* SPLIT_QT*/
        x1 = x0 + ( cbWidth / 2 )
        y1 = y0 + ( cbHeight / 2 )
        transform_unit ( x0, y0, cbWidth / 2, cbHeight / 2treeType, 0, chType)
        transform_unit ( x1, y0, cbWidth / 2, cbHeight / 2treeType, 1, chType)
        transform_unit ( x0, y1, cbWidth / 2, cbHeight / 2, treeType, 2, chType)
        transform_unit ( x1, y1, cbWidth / 2, cbHeight / 2, treeType, 3, chType)
      }
    }
}
``` | |

TABLE 10

Transform unit syntax of added PU split for small blocks in single tree

| | Descriptor |
|---|---|
| ```
transform_unit( x0, y0, tbWidth, tbHeight, treeType, subTuIndex, chType ) {
  if( ( treeType = = SINGLE_TREE || treeType = = DUAL_TREE_CHROMA ) &&
      ChromaArrayType != 0 ) {
    if( ( IntraSubPartitionsSplitType = = ISP_NO_SPLIT && CuPredMode[ chType ][ x0 ][ y0 ]
!= MODE_INTRA && !( cu_sbt_flag &&
        ( ( subTuIndex = = 0 && cu_sbt_pos_flag ) ||
          ( subTuIndex = = 1 && !cu_sbt_pos_flag ) ) ) ) ||
      ( IntraSubPartitionsSplitType != ISP_NO_SPLIT &&
        ( subTuIndex = = NumIntraSubPartitions − 1 ) ) ||
(CuPredMode[ chType ][ x0 ][ y0 ] = = MODE_INTRA && treeType = = SINGLE_TREE &&
subTuIndex = = NumIntraPuPartitions − 1)) {
      tu_cbf_cb[ x0 ][ y0 ]
``` | ae(v) |
| ```      tu_cbf_cr[ x0 ][ y0 ]``` | ae(v) |
| ```
    }
  }
  if( treeType = = SINGLE_TREE || treeType = = DUAL_TREE_LUMA ) {
    if( ( IntraSubPartitionsSplitType = = ISP_NO_SPLIT && !( cu_sbt_flag &&
        ( ( subTuIndex = = 0 && cu_sbt_pos_flag ) ||
          ( subTuIndex = = 1 && !cu_sbt_pos_flag ) ) ) &&
        ( CuPredMode[ chType ][ x0 ][ y0 ] = = MODE_INTRA ||
          tu_cbf_cb[ x0 ][ y0 ] || tu_cbf_cr[ x0 ][ y0 ] ||
          CbWidth[ chType ][ x0 ][ y0 ] > MaxTbSizeY ||
          CbHeight[ chType ][ x0 ][ y0 ] > MaxTbSizeY ) ) ||
      ( IntraSubPartitionsSplitType != ISP_NO_SPLIT &&
        ( subTuIndex < NumIntraSubPartitions − 1 || !InferTuCbfLuma ) ) )
      tu_cbf_luma[ x0 ][ y0 ]
``` | ae(v) |
| ```
    if (IntraSubPartitionsSplitType != ISP_NO_SPLIT )
      InferTuCbfLuma = InferTuCbfLuma && !tu_cbf_luma[ x0 ][ y0 ]
  }
  if((( IntraSubPartitionsSplitType != ISP_NO_SPLIT && subTuIndex = =
NumIntraSubPartitions − 1) || (CuPredMode[ chType ][ x0 ][ y0 ] = = MODE_INTRA &&
subTuIndex = = NumIntraPuPartitions − 1) )
&& treeType = = SINGLE_TREE ) )
    xC = CbPosX[ chType ][ x0 ][ y0 ]
    yC = CbPosY[ chType ][ x0 ][ y0 ]
    wC = CbWidth[ chType ][ x0 ][ y0 ] / SubWidthC
    hC = CbHeight[ chType ][ x0 ][ y0 ] / SubHeightC
  } else
    xC = x0
    yC = y0
    wC = tbWidth / SubWidthC
    hC = tbHeight / SubHeightC
}
``` | |

When the parameter pred_mode_plt_flag is equal to 1, the variable CuPredMode[x][y] is set to be equal to MODE_PLT for x=x0 . . . x0+cbWidth−1 and y=y0 . . . y0+cbHeight−1.

The variables allowPuSplitQt, allowPuSplitBtVer, allowPuSplitBtHor, allowPuSplitTtVer, and allowPuSplitTtHor are derived as follows:

The allowed pu quad split process as specified in clause 6.4.4 is invoked with the coding block size cbSize set equal to cbWidth, the current multi-type tree depth mttDepth, and treeTypeCurr as inputs, and the output is assigned to allowPuSplitQt.

The allowed pu binary split process as specified in clause 6.4.5 is invoked with the binary split mode SPLIT_BT_VER, the coding block width cbWidth, the coding block height cbHeight, the location (x0, y0), the current multi-type tree depth mttDepth, the maximum multi-type tree depth with offset maxMttDepth, the maximum binary tree size maxBtSize, the minimum quadtree size minQtSize, the current partition index partIdx, and treeTypeCurr as inputs, and the output is assigned to allowPuSplitBtVer.

The allowed pu binary split process as specified in clause 6.4.5 is invoked with the binary split mode SPLIT_BT_HOR, the coding block height cbHeight, the coding block width cbWidth, the location (x0, y0), the current multi-type tree depth mttDepth, the maximum multi-type tree depth with offset maxMttDepth, the maximum binary tree size maxBtSize, the minimum quadtree size minQtSize, the current partition index partIdx, and treeTypeCurr as inputs, and the output is assigned to allowPuSplitBtHor.

The allowed pu ternary split process as specified in clause 6.4.6 is invoked with the ternary split mode SPLIT_TT_VER, the coding block width cbWidth, the coding block height cbHeight, the location (x0, y0), the current multi-type tree depth mttDepth, the maximum multi-type tree depth with offset maxMttDepth, the maximum ternary tree size maxTtSize, and treeTypeCurr as inputs, and the output is assigned to allowPuSplitTtVer.

The allowed pu ternary split process as specified in clause 6.4.6 is invoked with the ternary split mode SPLIT_TT_HOR, the coding block height cbHeight, the coding block width cbWidth, the location (x0, y0), the current multi-type tree depth mttDepth, the maximum multi-type tree depth with offset maxMttDepth, the maximum ternary tree size maxTtSize, and treeType-Curr as inputs, and the output is assigned to allowPuSplitTtHor.

The parameter split_pu_flag equal to 0 specifies that a coding unit only has one prediction units. split_pu_flag equal to 1 specifies that a coding unit is split into four prediction units using a quad split as indicated by the syntax element split_pu_qt_flag, or into two coding units using a binary split or into three coding units using a ternary split as indicated by the syntax element mtt_split_pu_binary_flag. The binary or ternary split can be either vertical or horizontal as indicated by the syntax element mtt_split_pu_vertical_flag.

The parameter split_pu_qt_flag specifies whether a coding unit is split into prediction units with half horizontal and vertical size.

When split_pu_qt_flag is not present, the following applies: if allowPuSplitQt is equal to TRUE, the value of split_qt_flag is inferred to be equal to 1. Otherwise, the value of split_pu_qt_flag is inferred to be equal to 0.

The parameter mtt_split_pu_vertical_flag equal to 0 specifies that a coding unit is split horizontally. mtt_split_pu_vertical_flag equal to 1 specifies that a coding unit is split vertically.

When mtt_split_pu_vertical_flag is not present, it is inferred as follows: If allowPuSplitBtHor is equal to TRUE or allowPuSplitTtHor is equal to TRUE, the value of mtt_split_pu_vertical_flag is inferred to be equal to 0. Otherwise, the value of mtt_split_cu_vertical_flag is inferred to be equal to 1.

The parameter mtt_split_pu_binary_flag equal to 0 specifies that a coding unit is split into three prediction units using a ternary split. mtt_split_pu_binary_flag equal to 1 specifies that a coding unit is split into two prediction units using a binary split.

When mtt_split_pu_binary_flag is not present, it is inferred as follows:
  If allowPuSplitBtVer is equal to FALSE and allowPuSplitBtHor is equal to FALSE, the value of mtt_split_pu_binary_flag is inferred to be equal to 0.
  Otherwise, if allowPuSplitTtVer is equal to FALSE and allowPuSplitTtHor is equal to FALSE, the value of mtt_split_pu_binary_flag is inferred as to be equal to 1.
  Otherwise, if allowPuSplitBtHor is equal to TRUE and allowPuSplitTtVer is equal to TRUE, the value of mtt_split_pu_binary_flag is inferred to be equal to mtt_split_pu_vertical_flag.
  Otherwise (allowPuSplitBtVer is equal to TRUE and allowPuSplitTtHor is equal to TRUE), the value of mtt_split_pu_binary_flag is inferred to be equal to mtt_split_pu_vertical_flag.

The variable MttSplitMode[x][y][mttDepth] is derived from the value of mtt_split_cu_vertical_flag and from the value of mtt_split_cu_binary_flag as defined in Table 11 for x=x0 . . . x0+cbWidth−1 and y=y0 . . . y0+cbHeight−1.

TABLE 11

Specification of MttSplitMode[ x ][ y ][ mttDepth ] for x = x0..x0 + cbWidth − 1 and y = y0..y0 + cbHeight − 1

| MttSplitMode[ x0 ][ y0 ][ mttDepth ] | mtt_split_pu_vertical_flag | mtt_split_pu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

The variable NumIntraPuPartitions specifies the number of prediction partitions into which an intra luma coding block is divided. NumIntraPuPartitions is derived as follows:
  If MttSplitMode[x][y][mttDepth] is equal to SPLIT_BT_HOR or SPLIT_BT_VER, NumIntraPuPartitions is set equal to 2.
  Otherwise, if MttSplitMode[x][y][mttDepth] is equal to SPLIT_TT_HOR or SPLIT_TT_VER, NumIntraPuPartitions is set equal to 3.
    cbWidth is equal to 4 and cbHeight is equal to 8,
    cbWidth is equal to 8 and cbHeight is equal to 4.
  Otherwise, if split_pu_qt_flag is equal to 1, NumIntraPuPartitions is set equal to 4.
  Otherwise, NumIntraPuPartitions is set equal to 1.

In a third sub-set of the first group of embodiments, intra coded CU is disallowed when the chroma size of current CU is 4×2, 2×4 or 2×2 and single tree is employed for luma and chroma components of current slice.

In a fourth sub-set of the first group of embodiments, the luma PU and chroma PU can have different block aspect ratio. For example, an 8×8 CU is split as two 8×4 or 4×8 luma Pus and one 4×4 chroma PU.

In some embodiments, the first group of embodiments described above are only applied when the luma component resolution is greater than the chroma resolution, e.g., YUV format 4:2:0 or YUV format 4:2:2.

The second group of embodiments address situations when the CTU is allowed to have a local dual tree structure (SCIPU employed).

When a current CU belongs to a current SCIPU, the chroma CBs of the current CU is the leaf node of the chroma coding tree of the CTU, and the luma CB of the current CU is further split to child nodes in the luma coding tree of the CTU. In some embodiments, the tree depth within one SCIPU region is limited to less than or equal to a threshold T2. T2 is a positive integer, such as 1 or 2. That is, a tree depth of the luma component of the current CU is limited to 1 or 2. In one example, the tree depth within one SCIPU region is limited to less than or equal to threshold T2 when all the CUs in current SCIPU region is intra-coded CU.

As discussed above, the restriction of disallowing 2×N chroma intra prediction in CIIP mode may not work when the color format is not 4:2:0, such as 4:2:2 or 4:4:4. The embodiments described below modify CIIP mode when current block size meets certain conditions to avoid chroma intra prediction on blocks with size of 2 on one side. The embodiments may be applied when CTU has a single tree structure or a local dual tree structure. That is, first N levels of partitioning structures for luma and chroma components of the CTU are the same, N being an integer greater than 1.

In one embodiment, when luma block width of the current CU is less than or equal to 4 luma samples, CIIP mode is disabled for the current CU. In other words, when a width of a luma block of the current CU is less than or equal to 4 luma samples, the prediction information of the current CU indicates that CIIP mode is disabled. Table 12 shows a merge data syntax for implementing this embodiment. In Table 12, two occurrences of "cbWidth>4 &&" are related to the CIIP mode modification.

TABLE 12

| Merge data syntax | Descriptor |
|---|---|
| merge_data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight) >= 64 && ( (cbWidth > 4 && sps_ciip_enabled_flag && | |
|         cu_skip_flag[ x0 ][ y0 ] = = 0 && cbWidth < 128 && cbHeight < 128) \|\| | |
|         ( sps_triangle_enabled_flag && MaxNumTriangleMergeCand > 1 && | |
|         slice_type = = B ) ) ) | |
|         regular_merge_flag[ x0 ][ y0 ] | ae(v) |
|       if( regular_merge_flag[ x0 ][ y0 ] = = 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ] [ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|           MaxNumTriangleMergeCand > 1 && slice_type = = B && | |
|           cu_skip_flag[ x0 ][ y0 ] = = 0 && cbWidth > 4 && | |
|           ( cbWidth * cbHeight) >= 64 && cbWidth < 128 && cbHeight < 128 ) | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | |

The parameter ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:

If all the following conditions are true, ciip_flag[x0][y0] is inferred to be equal to 1:
  sps_ciip_enabled_flag is equal to 1.
  general_merge_flag[x0][y0] is equal to 1.

Table 13 shows a merge data syntax for implementing this embodiment. In Table 13, two occurrences of "cbWidth/SubWidthC)>=4 &&" are related to the CIIP mode modification.

TABLE 13

| Merge data syntax | Descriptor |
|---|---|
| merge_data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && | |
|         ( ( ( cbWidth / SubWidthC ) >= 4 && sps_ciip_enabled_flag && | |
|         cu_skip_flag[ x0 ][ y0 ] = = 0 && cbWidth < 128 && cbHeight < 128) \|\| | |
|         ( sps_triangle_enabled_flag && MaxNumTriangleMergeCand > 1 && | |
|         slice_type = = B ) ) ) | |
|         regular_merge_flag[ x0 ][ y0 ] | ae(v) |
|       if( regular_merge_flag[ x0 ][ y0 ] = = 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ] [ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && | |
|         MaxNumTriangleMergeCand > 1 && slice_type = = B && | |
|         cu_skip_flag[ x0 ][ y0 ] = = 0 && ( cbWidth / SubWidthC ) >= 4 && | |
|         ( cbWidth * cbHeight) >= 64 && cbWidth < 128 && cbHeight < 128 ) | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | | merge_subblock_flag[x0][y0] is equal to 0.
  regular_merge_flag[x0][y0] is equal to 0.
  cbWidth is less than 128.
  cbHeight is less than 128.
  cbWidth*cbHeight is greater than or equal to 64.
  cbWidth is greater than 4.
Otherwise, ciip_flag[x0][y0] is inferred to be equal to 0.

In the above specification semantic text, "cbWidth is greater than 4" is added to implement this embodiment.

In one embodiment, when the current coding unit has a chroma component block width less than 4 chroma samples, CIIP mode is disabled for the current CU. In other words, when a width of a chroma block of the current CU is less than or equal to 4 chroma samples, the prediction information of the current CU indicates that CIIP mode is disabled.

When ciip_flag[x0][y0] is not present, it is inferred as follows:
  If all the following conditions are true, ciip_flag[x0][y0] is inferred to be equal to 1:
    sps_ciip_enabled_flag is equal to 1.
    general_merge_flag[x0][y0] is equal to 1.
    merge_subblock_flag[x0][y0] is equal to 0.
    regular_merge_flag[x0][y0] is equal to 0.
    cbWidth is less than 128.
    cbHeight is less than 128.
    cbWidth*cbHeight is greater than or equal to 64.
    (cbWidth/SubWidthC) is greater than or equal to 4.
  Otherwise, ciip_flag[x0][y0] is inferred to be equal to 0.

In the above specification semantic text, "(cbWidth/SubWidthC) is greater than or equal to 4" is added to implement this embodiment.

In one embodiment, when current coding unit has a chroma component block with width less than 4 chroma samples or the chroma height less than 4 chroma samples, CIIP mode is disabled for current coding unit. In other words, when both a width and a height of a chroma block of the current CU is less than or equal to 4 chroma samples, the prediction information of the current CU indicates that CIIP mode is disabled. Table 14 shows a merge data syntax for implementing this embodiment. In Table 14, two occurrences of "cbWidth/SubWidthC)>=4 && (cbHeight/SubHeightC)>=4 &&" are related to the CIIP mode modification.

(cbWidth/SubWidthC) is greater than or equal to 4
(cbHeight/SubHeightC) is greater than or equal to 4.
Otherwise, ciip_flag[x0][y0] is inferred to be equal to 0.

In the above specification semantic text, "(cbWidth/SubWidthC) is greater than or equal to 4" and "(cbHeight/SubHeightC) is greater than or equal to 4" added to implement this embodiment.

In one embodiments, when CIIP mode is used for the current block, when current coding unit has a chroma component block with width less than 4 chroma samples,

TABLE 14

Merge data syntax

| | Descriptor |
|---|---|
| merge_data( x0, y0, cbWidth, cbHeight, chType ) { | |
|   if( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (( cbWidth / SubWidthC ) >= 4 && | |
|       ( cbHeight / SubHeightC ) >= 4 && sps_ciip_enabled_flag && | |
|       cu_skip_flag[ x0 ][ y0 ] = = 0 && cbWidth < 128 && cbHeight < 128) \|\| | |
|       ( sps_triangle_enabled_flag && MaxNumTriangleMergeCand > 1 && | |
|       slice_type = = B ) ) ) | |
|       regular_merge_flag[ x0 ][ y0 ] | ae(v) |
|     if( regular_merge_flag[ x0 ][ y0 ] = = 1 ){ | |
|       if( sps_mmvd_enabled_flag ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ] [ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumMergeCand > 1 ) | |
|           merge_idx[ x0 ][ y0 ] | ae(v) |
|       } | |
|     } else { | |
|       if( sps_ciip_enabled_flag && sps_triangle_enabled_flag && | |
|       MaxNumTriangleMergeCand > 1 && slice_type = = B && | |
|       cu_skip_flag[ x0 ][ y0 ] = = 0 && | |
|       ( cbWidth / SubWidthC ) >= 4 && ( cbHeight / SubHeightC ) >= 4 | |
|       ( cbWidth * cbHeight ) >= 64 && cbWidth < 128 && cbHeight < 128 ) | |
|         ciip_flag[ x0 ][ y0 ] | ae(v) |
|       if( ciip_flag[ x0 ][ y0 ] && MaxNumTriangleMerCand > 1 ) | |
|         merge_idx[ x0 ][ y0 ] | ae(v) |
|       if( !ciip_flag[ x0 ][ y0 ] && MaxNumTriangleMergeCand > 1 ) { | |
|         merge_triangle_split_dir[ x0 ][ y0 ] | ae(v) |
|         merge_triangle_idx0[ x0 ][ y0 ] | ae(v) |
|         merge_triangle_idx1[ x0 ][ y0 ] | ae(v) |
|       } | |
|     } | |
|   } | |
| } | |

When ciip_flag[x0][y0] is not present, it is inferred as follows:
If all the following conditions are true, ciip_flag[x0][y0] is inferred to be equal to 1:
sps_ciip_enabled_flag is equal to 1.
general_merge_flag[x0][y0] is equal to 1.
merge_subblock_flag[x0][y0] is equal to 0.
regular_merge_flag[x0][y0] is equal to 0.
cbWidth is less than 128.
cbHeight is less than 128.
cbWidth*cbHeight is greater than or equal to 64.

final prediction output may only use chroma inter prediction output for CIIP, in other words, the weighted sample prediction process for combined merge and intra prediction is only applied to luma samples. That is, the prediction information of the current CU indicates that the CIIP mode is enabled for the luma CB of the current CU and disabled for the chroma CB of the current CU, when a width of the chroma CB of the current CU is less than or equal to 4 chroma samples. The chroma CB is reconstructed by inter prediction instead of CIIP.

Alternatively, when the current CU is below a luma size threshold or below a chroma size threshold, the weighted sample prediction process for combined merge and intra prediction is only applied to luma samples.

In one example, specification text of the CIIP mode are as follows: in a decoding process for inter blocks whose output is an array predSamples of prediction samples, when ciip_flag[xCb][yCb] is equal to 1, the array predSamples of prediction samples is modified as follows:

If cIdx is equal to 0, the following applies:
The general intra sample prediction process as specified in clause 8.4.5.2.5 is invoked with the location (xTbCmp, yTbCmp) set equal to (xCb, yCb), the intra prediction mode predModeIntra set equal to IntraPredModeY[xCb][yCb], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntra$_L$.

The weighted sample prediction process for combined merge and intra prediction as specified in clause 8.5.6.7 is invoked with the location (xTbCmp, yTbCmp) set equal to (xCb, yCb), the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[xCb][yCb], and the colour component index cIdx as inputs, and the output is assigend to the (cbWidth)×(cbHeight) array predSamples.

Otherwise, if cIdx is equal to 1 and cbWidth/SubWidthC is greater than or equal to 4, the following applies:
The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to IntraPredModeY[xCb][yCb], the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntracb.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamplescb and predSamplesIntracb, respectively, the intra prediction mode predModeIntra set equal to IntraPredModeY[xCb][yCb], and the colour component index cIdx as inputs, and the output is assigent to the (cbWidth/SubWidthC)×(cbHeight/SubHeightC) array predSamples.

Otherwise (cIdx is equal to 2), if cbWidth/SubWidthC is greater than or equal to 4, the following applies:
The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to IntraPredModeY[xCb][yCb], the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntra$_{Cr}$.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamples$_{Cr}$ and predSamplesIntra$_{Cr}$, respectively, the intra prediction mode predModeIntra set equal to IntraPredModeY[xCb][yCb], and the colour component index cIdx as inputs, and the output is assigend to the (cbWidth/SubWidthC)×(cbHeight/SubHeightC) array predSamples.

In the above text, "if cbWidth/SubWidthC is greater than or equal to 4" is relevant to this embodiment.

In another embodiment, when CIIP mode is used for current CU, when current CU has a chroma block width less than 4 chroma samples or a chroma block height less than 4 chroma samples, final prediction output may only use chroma inter prediction output for CIIP, in other words, the weighted sample prediction process for combined merge and intra prediction is only applied to luma samples. That is, the prediction information of the current CU indicates that the CIIP mode is enabled for the luma CB of the current CU and disabled for the chroma CB of the current CU when the width or a height of the chroma CB of the current CU is less than or equal to 4 chroma samples.

In one example, specification text of the CIIP mode are as follows: in a decoding process for inter blocks whose output is an array predSamples of prediction samples, when ciip_flag[xCb][yCb] is equal to 1, the array predSamples of prediction samples is modified as follows:

If cIdx is equal to 0, the following applies:
The general intra sample prediction process as specified in clause 8.4.5.2.5 is invoked with the location (xTbCmp, yTbCmp) set equal to (xCb, yCb), the intra prediction mode predModeIntra set equal to IntraPredModeY[xCb][yCb], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntrau The weighted sample prediction process for combined merge and intra prediction as specified in clause 8.5.6.7 is invoked with the location (xTbCmp, yTbCmp) set equal to (xCb, yCb), the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[xCb][yCb], and the colour component index cIdx as inputs, and the output is assigend to the (cbWidth)×(cbHeight) array predSamples.

Otherwise, if cIdx is equal to 1 and cbWidth/SubWidthC is greater than or equal to 4 or cbHeight/SubHeightC is greater than or equal to 4, the following applies:

The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to IntraPredModeY[xCb][yCb], the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntracb.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamplescb and predSamplesIntracb, respectively, the intra prediction mode predModeIntra set equal to IntraPredModeY[xCb][yCb], and the colour component index cIdx as inputs, and the output is assigend to the (cbWidth/SubWidthC)×(cbHeight/SubHeightC) array predSamples.

Otherwise (cIdx is equal to 2), if cbWidth/SubWidthC is greater than or equal to 4 or cbHeight/SubHeightC is greater than or equal to 4, the following applies:

The general intra sample prediction process as specified in clause 8.4.5.2.5 is invoked with the location (xTbCmp, yTbCmp) set equal to (xCb/SubWidthC, yCb/SubHeightC), the intra prediction mode predModeIntra set equal to IntraPredModeY[xCb][yCb], the transform block width nTbW and height nTbH set equal to cbWidth/SubWidthC and cbHeight/SubHeightC, the coding block width nCbW and height nCbH set equal to cbWidth/SubWidthC and cbHeight/SubHeightC, and the variable cIdx as inputs, and the output is assigned to the (cbWidth/SubWidthC)×(cbHeight/SubHeightC) array predSamplesIntra$_{Cr}$.

The weighted sample prediction process for combined merge and intra prediction as specified in clause 8.5.6.7 is invoked with the location (xTbCmp, yTbCmp) set equal to (xCb, yCb), the coding block width cbWidth/SubWidthC, the coding block height cbHeight/SubHeightC, the sample arrays predSamplesInter and predSamplesIntra set equal to predSamples$_{Cr}$ and predSamplesIntra$_{Cr}$, respectively, the intra prediction mode predModeIntra set equal to IntraPredModeY[xCb][yCb], and the colour component index cIdx as inputs, and the output is assigend to the (cbWidth/SubWidthC)×(cbHeight/SubHeightC) array predSamples.

In the above text, "if cbWidth/SubWidthC is greater than or equal to 4 or cbHeight/SubHeightC is greater than or equal to 4" is relevant to this embodiment.

To remove 2×N intra chroma in dual tree or local dual tree, binary tree split and ternary tree split are prohibited for blocks with width of 4 and 8, respectively. The embodiments described below limit the block size for intra prediction to disallow chroma intra block with block width of 2, with support of all chroma formats.

In one embodiment, when the partitioning of current CTU is in dual tree mode, if the current coding unit has a chroma component block width less than or equal to 4, binary tree vertical splitting is disabled, and if current coding unit has chroma component block width less than or equal to 8, ternary tree vertical splitting is disabled.

When the partitioning of current CTU is in single tree mode, if the current coding unit's chroma component block width is 4 and the split is binary vertical split or the current coding unit's chroma component block width is 8 and the split is ternary vertical split, the current block is treated as a SCIPU. So that the chroma component blocks are not split if the current coding unit is an intra-SCIPU, and if the current coding unit is an inter-SCIPU, the split of chroma component blocks are inherited from the luma component block.

In one example, the related specification text can be modified as follows. In allowed binary split process.

In allowed binary split process, inputs to this process are:
a coding block width cbWidth in luma samples,
a coding block height cbHeight in luma samples,
a location (x0, y0) of the top-left luma sample of the considered coding block relative to the top-left luma sample of the picture,
a multi-type tree depth mttDepth,
a maximum multi-type tree depth with offset maxMttDepth,
a maximum binary tree size maxBtSize,
a minimium quadtree size minQtSize,
a partition index partIdx,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
a variable modeType specifying whether intra (MODE_INTRA), IBC (MODE_IBC), palette (MODE_PLT), and inter coding modes can be used (MODE_TYPE_ALL), or whether only intra, IBC, and palette coding modes can be used (MODE_TYPE_INTRA), or whether only inter coding modes can be used (MODE_TYPE_INTER) for coding units inside the coding tree node.

In allowed binary split process, output of this process is the variable allowBtSplit.

The variable allowBtSplit is derived as follows:
If one or more of the following conditions are true, allowBtSplit is set equal to FALSE:
cbSize is less than or equal to MinBtSizeY
cbWidth is greater than maxBtSize
cbHeight is greater than maxBtSize
mttDepth is greater than or equal to maxMttDepth
treeType is equal to DUAL_TREE_CHROMA and (cbWidth/SubWidthC)*(cbHeight/SubHeightC) is less than or equal to 16
treeType is equal to DUAL_TREE_CHROMA and btSplit is equal to SPLIT_BT_VER and (cbWidth/SubWidthC) is equal to 4
treeType is equal to DUAL_TREE_CHROMA and modeType is equal to MODE_TYPE_INTRA

. . . .

In the above text, "treeType is equal to DUAL_TREE_CHROMA and btSplit is equal to SPLIT_BT_VER and (cbWidth/SubWidthC) is equal to 4" is a modification according to this embodiment.

In allowed ternary split process, inputs to this process are:
a ternary split mode ttSplit,
a coding block width cbWidth in luma samples,
a coding block height cbHeight in luma samples, a location (x0, y0) of the top-left luma sample of the considered coding block relative to the top-left luma sample of the picture, a multi-type tree depth mttDepth a maximum multi-type tree depth with offset maxMtt-Depth, a maximum ternary tree size maxTtSize, a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed, a variable modeType specifying whether intra (MODE_INTRA), IBC (MODE_IBC), palette (MODE_PLT), and inter coding modes can be used (MODE_TYPE_ALL), or whether only intra, IBC, and palette coding modes can be used (MODE_TYPE_INTRA), or whether only inter coding modes can be used (MODE_TYPE_INTER) for coding units inside the coding tree node.

In allowed ternary split process, output of this process is the variable allowTtSplit.

The variable allowTtSplit is derived as follows:

If one or more of the following conditions are true, allowTtSplit is set equal to FALSE:

cbSize is less than or equal to 2*MinTtSizeY cbWidth is greater than Min(MaxTbSizeY, maxTtSize)

cbHeight is greater than Min(MaxTbSizeY, maxTtSize)

mttDepth is greater than or equal to maxMttDepth x0+cbWidth is greater than pic_width_in_luma_samples y0+cbHeight is greater than pic_height_in_luma_samples treeType is equal to DUAL_TREE_CHROMA and (cbWidth/SubWidthC)*(cbHeight/SubHeightC) is less than or equal to 32 treeType is equal to DUAL_TREE_CHROMA and btSplit is equal to SPLIT_TT_VER and (cbWidth/SubWidthC) is equal to 8 treeType is equal to DUAL_TREE_CHROMA and modeType is equal to MODE_TYPE_INTRA

Otherwise, allowTtSplit is set equal to TRUE.

In the above text, "treeType is equal to DUAL_TREE_CHROMA and btSplit is equal to SPLIT_TT_VER and (cbWidth/SubWidthC) is equal to 8" is a modification according to this embodiment.

In coding tree semantics, the variable modeTypeCondition is derived as follows:

If one of the following conditions is true, modeTypeCondition is set equal to 0 slice_type==I and qtbtt_dual_tree_intra_flag is equal to 1 modeTypeCurr is not equal to MODE_TYPE_ALL

Otherwise, if one of the following conditions is true, modeTypeCondition is set equal to 1 cbWidth*cbHeight is equal to 64 and split_qt_flag is equal to 1 cbWidth*cbHeight is equal to 64 and MttSplitMode[x0][y0][mttDepth] is equal to SPLIT_TT_HOR or SPLIT_TT_VER cbWidth*cbHeight is equal to 32 and MttSplitMode[x0][y0][mttDepth] is equal to SPLIT_BT_HOR or SPLIT_BT_VER Otherwise, if one of the following conditions is true, modeTypeCondition is set equal to 1+(slice_type!=I? 1:0)

cbWidth*cbHeight is equal to 64 and MttSplitMode[x0][y0][mttDepth] is equal to SPLIT_BT_HOR or SPLIT_BT_VER cbWidth*cbHeight is equal to 128 and MttSplitMode[x0][y0][mttDepth] is equal to SPLIT_TT_HOR or SPLIT_TT_VER (cbWidth/SubWidthC) is equal to 4 and MttSplitMode[x0][y0][mttDepth] is equal to SPLIT_BT_VER (cbWidth/SubWidthC) is equal to 8 and MttSplitMode[x0][y0][mttDepth] is equal to SPLIT_TT_VER Otherwise, modeTypeCondition is set equal to 0

In the above text, "(cbWidth/SubWidthC) is equal to 4 and MttSplitMode[x0][y0][mttDepth] is equal to SPLIT_BT_VER" and "(cbWidth/SubWidthC) is equal to 8 and MttSplitMode[x0][y0][mttDepth] is equal to SPLIT_TT_VER" are relevant to the partitioning restriction.

The third group of embodiments of the present disclosure address the situations when CTU has a dual tree structure. One problem in VVC draft 6 is that variable MinCbLog 2SizeC is used in the specification text, but the method of its derivation is not defined. This variable indicates a base 2 logarithm value of a minimum size of a chroma CB. The third group of embodiments can solve the problem. The third group of embodiments also provides methods of deriving minimum size of chroma coding blocks and/or minimum size of chroma quadtree nodes.

In some embodiments, the CTU has a dual tree structure indicating separate partitioning structures for luma and chroma components of the segment and the prediction type of the CTU is intra prediction. That is, intra dual tree is used. The prediction information of the current CU includes a variable MinCbLog 2SizeC indicating a binary logarithmic value of a minimum size of the chroma CB of the current CU, the variable MinCbLog 2SizeC being at least 2. The variable MinCbLog 2SizeC may be derived from, for example, a signal that indicates indicate the minimum chroma coding block size in chroma samples, a higher value of 2 and a difference value between a minimum luma coding block size MinCbLog 2SizeY and a horizontal chroma sub-sampling factor based on color format, a higher value of 2 and a difference value between the minimum luma coding block size MinCbLog 2SizeY and a vertical chroma sub-sampling factor based on color format.

In one embodiment, when intra dual tree is used, one syntax element, log 2_min_chroma_coding_block_size_minus2, is signaled to indicate the minimum chroma coding block size in chroma samples. The minimum chroma coding block size may be calculated as following:

MinCbLog2SizeC=log 2_min_chroma_coding_block_size_minus2+2

MinCbSizeC=1<<MinCbLog2SizeChroma

In one example, the sequence parameter set raw byte sequence payload (RBSP) syntax may be modified as shown in Table 15, where "if (qtbtt_dual_tree_intra_flag) log 2_min_chroma_coding_block_size_minus2" is added to original syntax.

TABLE 15

Modified sequence parameter set RBSP syntax

| | Descriptor |
|---|---|
| seq_parameter_set_rbsp( ) { | |
| ... | |
| if( ChromaArrayType != 0 ) | |

TABLE 15-continued

Modified sequence parameter set RBSP syntax

| | Descriptor |
|---|---|
| qtbtt_dual_tree_intra_flag | u(1) |
| log2_min_luma_coding_block_size_minus2 | ue(v) |
| if (qtbtt_dual_tree_intra_flag) | |
|   log2_min_chroma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| ... | |

The parameter log 2_min_chroma_coding_block_size_minus2 plus 2 specifies the minimum chroma coding block size. The value range of log 2_min_chroma_coding_block_size_minus2 shall be in the range of 0 to log 2_ctu_size_minus5+3, inclusive. The variables MinCbLog 2SizeC, In one embodiment, when intra dual tree mode is enabled, the minimum chroma coding block size MinCbLog 2SizeC is derived from minimum luma coding block size MinCbLog 2SizeY, according to the horizontal chroma sub-sampling factor based on chroma format (e.g., parameter ChromaShiftHor). In one example, the horizontal chroma shift ChromaShiftHor is defined in Table 16.

TABLE 16

Horizontal chroma shift and Vertical chroma shift definition

| chroma_format_idc | separate_colour_plane_flag | Chroma format | ChromaShiftHor | ChromaShiftVer |
|---|---|---|---|---|
| 0 | 0 | Monochrome | 0 | 0 |
| 1 | 0 | 4:2:0 | 1 | 1 |
| 2 | 0 | 4:2:2 | 1 | 0 |
| 3 | 0 | 4:4:4 | 0 | 0 |
| 3 | 1 | 4:4:4 | 0 | 0 |

The related semantics may include the following.

The parameter log 2_min_chroma_coding_block_size_minus2 plus 2 specifies the minimum chroma coding block size. The value range of log 2_min_chroma_coding_block_size_minus2 shall be in the range of 0 to log 2_ctu_size_minus5+3, inclusive.

The variable MinCbLog 2SizeC is derived as follows:

$$MinCbLog2SizeC = \max(2, MinCbLog2SizeY - ChromaShiftHor)$$

In one example, when the current chroma format is 4:2:0, the derivation of MinCbLog 2SizeC is:

$$MinCbLog2SizeC = \max(2, MinCbLog2SizeY - 1)$$

In another example, when the current chroma format is 4:4:4, the derivation of MinCbLog 2SizeC is:

$$MinCbLog2SizeC = \max(2, MinCbLog2SizeY)$$

In one embodiment, when intra dual tree mode is enabled, the minimum chroma coding block size MinCbLog 2SizeC is derived from minimum luma coding block size MinCbLog 2SizeY, according to the vertical chroma sub-sampling factor based on color format. (e.g., parameter ChromaShiftVer). In one example, the vertical chroma shift ChromaShiftVer is also defined in Table 16.

The variable MinCbLog 2SizeC is derived as follows:

$$MinCbLog2SizeC = \max(2, MinCbLog2SizeY - ChromaShiftVer)$$

In one example, when the current chroma format is 4:2:0, the derivation of MinCbLog 2SizeC is:

$$MinCbLog2SizeC = \max(2, MinCbLog2SizeY - 1)$$

In another example, when the current chroma format is 4:4:4, the derivation of MinCbLog 2SizeC is:

$$MinCbLog2SizeC = \max(2, MinCbLog2SizeY)$$

In one embodiment, when intra dual tree mode is enabled, the minimum chroma coding block size is not signaled but is always set to a predefined fixed value, such as 4 chroma samples, or 8 chroma samples.

In one embodiment, there is a conforming constraint that picture width and height in chroma samples shall be multiple of MinCbSizeC.

In some embodiments, derivation methods of a minimum size of chroma quadtree nodes can be modified to support all color formats. The embodiments may be applied to sps_log 2_diff_min_qt_min_cb_intra_slice_chroma in in SPS, or similar syntax elements in picture parameter set (PPS), picture header, slice header or other headers.

In one embodiment, when intra dual tree mode is enabled, the signaling of syntax sps_log 2_diff_min_qt_min_cb_intra_slice_chroma is unchanged, but the semantic may be changed as following:

sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in chroma samples for chroma CUs with treeType equal to DUAL_TREE_CHROMA in slices with slice_type equal to 2 (I) referring to the SPS. When partition_constraints_override_enabled_flag is equal to 1, the default difference can be overridden by pic_log 2_diff_min_qt_min_cb_chroma present in PHs referring to the SPS. The value of sps_log 2_diff_min_qt_min_cb_intra_slice_chroma shall be in the range of 0 to CtbLog 2SizeY−MinCbLog 2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$MinQtLog2SizeIntraC = sps\_log2\_diff\_min\_qt\_min\_cb\_intra\_slice\_chroma + \max(2, MinCbLog2SizeY - ChromaShiftHor)$$

. . . .

In one example, when current chroma format is 4:2:0, the derivation of MinQtLog 2SizeIntraC is:

$$MinQtLog2SizeIntraC = sps\_log2\_diff\_min\_qt\_min\_cb\_intra\_slice\_chroma + \max(2, MinCbLog2SizeY - 1)$$

In another example, when current chroma format is 4:4:4, the derivation of MinQtLog 2SizeIntraC is:

MinQtLog2SizeIntra$C$=sps_log 2_diff_min_qt_min_cb_intra_slice_chroma+max(2, MinCbLog2Size$Y$)

Further in one embodiment, there is a conforming constraint that MinQtLog 2SizeIntraC shall be no smaller than max(2, MinCbLog 2SizeY−ChromaShiftHor).

In one embodiment, when intra dual tree mode is enabled, the minimum intra chroma quad tree node size may be signaled using syntax element: sps_log 2_diff_min_qt_chroma_min_cbintra_slice_chroma. The minimum chroma coding block size related variable MinCbLog 2SizeC may be derived using one of the methods as previously described.

In one example, the sequence parameter set RBSP syntax may be as shown in Table 17. The derivation of variable MinQtLog 2SizeIntraC can be obtained based on the syntax element sps_log 2_diff_min_qt_chroma_min_cb_intra_slice_chroma and the variable MinCbLog 2SizeC.

TABLE 17

| Modified sequence parameter set RBSP syntax | |
|---|---|
| | Descriptor |
| seq_parameter_set_rbsp( ) { | |
| ... | |
| if( qtbtt_dual_tree_intra_flag ) { | |
|   sps_log2_diff_min_qt_chroma_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| sps_joint_cber_enabled_flag | u(1) |
| ... | |
| } | |

The parameter sps_log 2_diff_min_qt_chroma_min_cbintra_slice_chroma specifies the default difference between the base 2 logarithm of the minimum size in chroma samples of a chroma leaf block resulting from quadtree splitting of a chroma CTU with treeType equal to DUAL_TREE_CHROMA and the base 2 logarithm of the minimum coding block size in chroma samples for chroma CUs with treeType equal to DUAL_TREE_CHROMA in slices with slice_type equal to 2 (I) referring to the SPS. When partition_constraints_override_enabled_flag is equal to 1, the default difference can be overridden by pic_log 2_diff_min_qt_chroma_min_cb_chroma present in PHs referring to the SPS. The value of sps_log 2_diff_min_qt_chroma_min_cb_intra_slice_chroma shall be in the range of 0 to CtbLog 2SizeChroma−MinCbLog 2SizeChroma, inclusive. When not present, the value of sps_log 2_diff_min_qt_chroma_min_cb_intra_slice_chroma is inferred to be equal to 0. The base 2 logarithm of the minimum size in chroma samples of a chroma leaf block resulting from quadtree splitting of a CTU with treeType equal to DUAL_TREE_CHROMA is derived as follows:

MinQtLog2SizeIntra$C$=sps_log 2_diff_min_qt_chroma_min_cb_intra_slice_chroma+MinCbLog2Size$C$ By using the disclosed methods and systems, small chroma block intra prediction is avoided, processing throughput in a decoding process can be enhanced. Further, constrains on avoiding small chroma block intra prediction support all color formats. In addition, derivation methods are provided for minimum size of chroma coding blocks and minimum size of chroma quadtree nodes.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A method for controlling block intra prediction for an encoder, comprising:
   obtaining a video bitstream;
   encoding the video bitstream with prediction information of a current coding unit (CU) in a segment of a current picture, comprising:
      upon determining that the segment has a single tree structure indicating a same partitioning structure for both luma and chroma components of the segment, and that a prediction type of a chroma coding block (CB) of the current CU is intra prediction, including the prediction type of the chroma CB of the current CU in the prediction information, wherein when block area size of the chroma CB is smaller than or equal to a threshold T1, T1 being a positive integer, a luma component of the current CU is allowed to be sub-partitioned into multiple prediction units (PUs) for intra prediction, and a chroma component of the current CU only has one PU, a PU being a basic unit for prediction; and
   outputting the encoded video bitstream, wherein a width of any reconstructed chroma CB intra-predicted from the encoded video bitstream is greater than 2.

2. The method according to claim 1, wherein T1 is 16 or 32.

3. The method according to claim 1, wherein:
   when the current CU is a leaf node in the single tree structure for intra prediction, the prediction information includes an extended Intra Sub-Partition (ISP) signal indicating whether the current CU is sub-partitioned based on an extended ISP type, the extended ISP type including at least one of a binary tree split, a ternary tree split, or a quad tree split.

4. The method according to claim 3, wherein:
each sub-partition of the current CU obtained based on the extended ISP type has an individual prediction mode.

5. The method according to claim 3, wherein when the current CU is sub-partitioned based on the extended ISP type, the prediction information includes a multiple transform set (MTS) flag and an MTS index for each sub-partition of the current CU.

6. The method according to claim 3, wherein when the current CU is sub-partitioned based on the extended ISP type, the prediction information includes a value indicating that Low Frequency Non-Separable Transform (LFNST) is not applied for the current CU at the decoder.

7. The method according to claim 3, wherein when a width of the current CU is not equal to a height of the current CU, the current CU is not allowed to be sub-partitioned based on the quad-tree split of the extended ISP type.

8. The method according to claim 1, wherein:
when the segment has the single tree structure, a size of a transform unit of the current CU is equal to a size of the corresponding PU.

9. The method according to claim 1, wherein encoding the video bitstream with the prediction information further comprises:
upon determining that a width of a luma CB of the current CU is less than or equal to 4 luma samples, or a width of the chroma CB of the current CU is less than or equal to 4 chroma samples, or the width and a height of the chroma CB of the current CU is less than or equal to 4 chroma samples, indicating, in the prediction information, that Combined Inter/Intra prediction (CIIP) mode is disabled for the current CU.

10. The method according to claim 1, wherein encoding the video bitstream with the prediction information further comprises:
indicating, in the prediction information, that CIIP mode is enabled for a luma CB of the current CU and disabled for the chroma CB of the current CU upon determining that a width of the chroma CB of the current CU is less than or equal to 4 chroma samples, or the width or a height of the chroma CB of the current CU is less than or equal to 4 chroma samples.

11. A method for controlling block intra prediction for an encoder, comprising:
obtaining a video bitstream;
encoding the video bitstream with prediction information of a current coding unit (CU) in a segment of a current picture, comprising:
upon determining that the current CU belongs to a current Small Chroma Intra Prediction Unit (SCIPU) and a tree depth of the SCIPU is less than or equal to a threshold T2, and that the prediction type of the chroma CB is intra prediction, including the prediction type of the chroma CB in the prediction information, a SCIPU being a coding tree node whose chroma CB size is larger than or equal to TH chroma samples and has at least one child luma CB whose size is smaller than 4TH luma samples, and T2 being 1 or 2; and
outputting the encoded video bitstream, wherein a width of any reconstructed chroma CB intra-predicted from the encoded video bitstream is greater than 2.

12. The method according to claim 11, wherein all CUs in the current SCIPU region are intra-coded CU.

13. A method for controlling block intra prediction for an encoder, comprising:
obtaining a video bitstream;
encoding the video bitstream with prediction information of a current coding unit (CU) in a segment of a current picture, comprising:
upon determining that the segment has a dual tree structure indicating separate partitioning structures for luma and chroma components of the segment, and that the prediction type of the segment is intra prediction, including the prediction type of the segment and a variable MinCbLog2SizeC in the prediction information, the variable MinCbLog2SizeC indicating a binary logarithmic value of a minimum size of the chroma CB of the current CU; and
outputting the encoded video bitstream, wherein a width of any reconstructed chroma CB intra-predicted from the coded video bitstream is greater than 2.

14. The method according to claim 13, wherein the variable MinCbLog2SizeC is derived by:
a higher value of 2 and a difference value between a minimum luma coding block size MinCbLog2SizeY and a horizontal chroma sub-sampling factor based on color format ChromaShiftHor;
the ChromaShiftHor being defined based on the table below:

| Chroma format | ChromaShiftHor |
|---|---|
| Monochrome | 0 |
| 4:2:0 | 1 |
| 4:2:2 | 1 |
| 4:4:4 | 0. |

15. The method according to claim 13, wherein the variable MinCbLog2SizeC is derived by:
a higher value of 2 and a difference value between the minimum luma coding block size MinCbLog2SizeY and a vertical chroma sub-sampling factor based on color format ChromaShiftVer,
the ChromaShiftVer being defined based on the table below:

| Chroma format | ChromaShiftVer |
|---|---|
| Monochrome | 0 |
| 4:2:0 | 1 |
| 4:2:2 | 0 |
| 4:4:4 | 0. |

16. The method according to claim 13, wherein encoding the video bitstream with the prediction information further comprises:
upon determining that a width of a luma CB of the current CU is less than or equal to 4 luma samples, or a width of the chroma CB of the current CU is less than or equal to 4 chroma samples, or the width and a height of the chroma CB of the current CU is less than or equal to 4 chroma samples, indicating, in the prediction information, that Combined Inter/Intra prediction (CIIP) mode is disabled for the current CU.

17. The method according to claim 13, wherein encoding the video bitstream with the prediction information further comprises:
indicating, in the prediction information, that CIIP mode is enabled for a luma CB of the current CU and disabled for the chroma CB of the current CU upon determining that a width of the chroma CB of the current CU is less than or equal to 4 chroma samples, or the width or a height of the chroma CB of the current CU is less than or equal to 4 chroma samples.

\* \* \* \* \*